US012627168B2

(12) United States Patent
    Elkhomri

(10) Patent No.: US 12,627,168 B2
(45) Date of Patent: May 12, 2026

(54) ENERGY STORAGE CONTROL METHODS FOR OPTIMAL VPP ENERGY MANAGEMENT

(71) Applicant: Banpu Innovation & Ventures LLC, Wilmington, DE (US)

(72) Inventor: Othman Elkhomri, Wilmington, DE (US)

(73) Assignee: Banpu Innovation & Ventures LLC, Wilmington, DE (US)

( * ) Notice: Subject to any disclaimer, the term of this patent is extended or adjusted under 35 U.S.C. 154(b) by 446 days.

(21) Appl. No.: 18/240,830

(22) Filed: Aug. 31, 2023

(65) Prior Publication Data

US 2025/0079883 A1     Mar. 6, 2025

(51) Int. Cl.
H02J 13/00      (2006.01)
H02J 7/00      (2006.01)

(52) U.S. Cl.
CPC ...... H02J 13/00002 (2020.01); H02J 7/0048 (2020.01); H02J 2203/20 (2020.01)

(58) Field of Classification Search
CPC ............... H02J 13/00002; H02J 7/0048; H02J 2203/20; H02J 7/00; H02J 2300/20; H02J 2300/22
See application file for complete search history.

(56) References Cited

U.S. PATENT DOCUMENTS

2008/0262820 A1* 10/2008 Nasle ................... G05B 13/048
                                                    705/412
2024/0332967 A1* 10/2024 Walkingshaw ......... G01W 1/10

* cited by examiner

*Primary Examiner* — Carlos Amaya
(74) *Attorney, Agent, or Firm* — Osha Bergman Watanabe & Burton LLP

(57) ABSTRACT

A method of operating a virtual power plant controller, that manages a power consumer connected to a power grid, a battery storage system, and an independent power plant, includes: obtaining a first data set including time-series information for each of power usage of the power consumer, power output of the independent power plant, power output capacity of the power grid, and state of charge of the battery storage system; training a machine learning (ML) model based on the time-series information using a ML algorithm, the ML model determines one or more parameters of an energy management system (EMS) policy to satisfy a power demand of the power consumer over a predetermined horizon; obtaining a second data set including power availability information; determining the one or more parameters of the EMS policy by inputting the second data set into the ML model; transmitting a command based on the EMS policy.

18 Claims, 10 Drawing Sheets

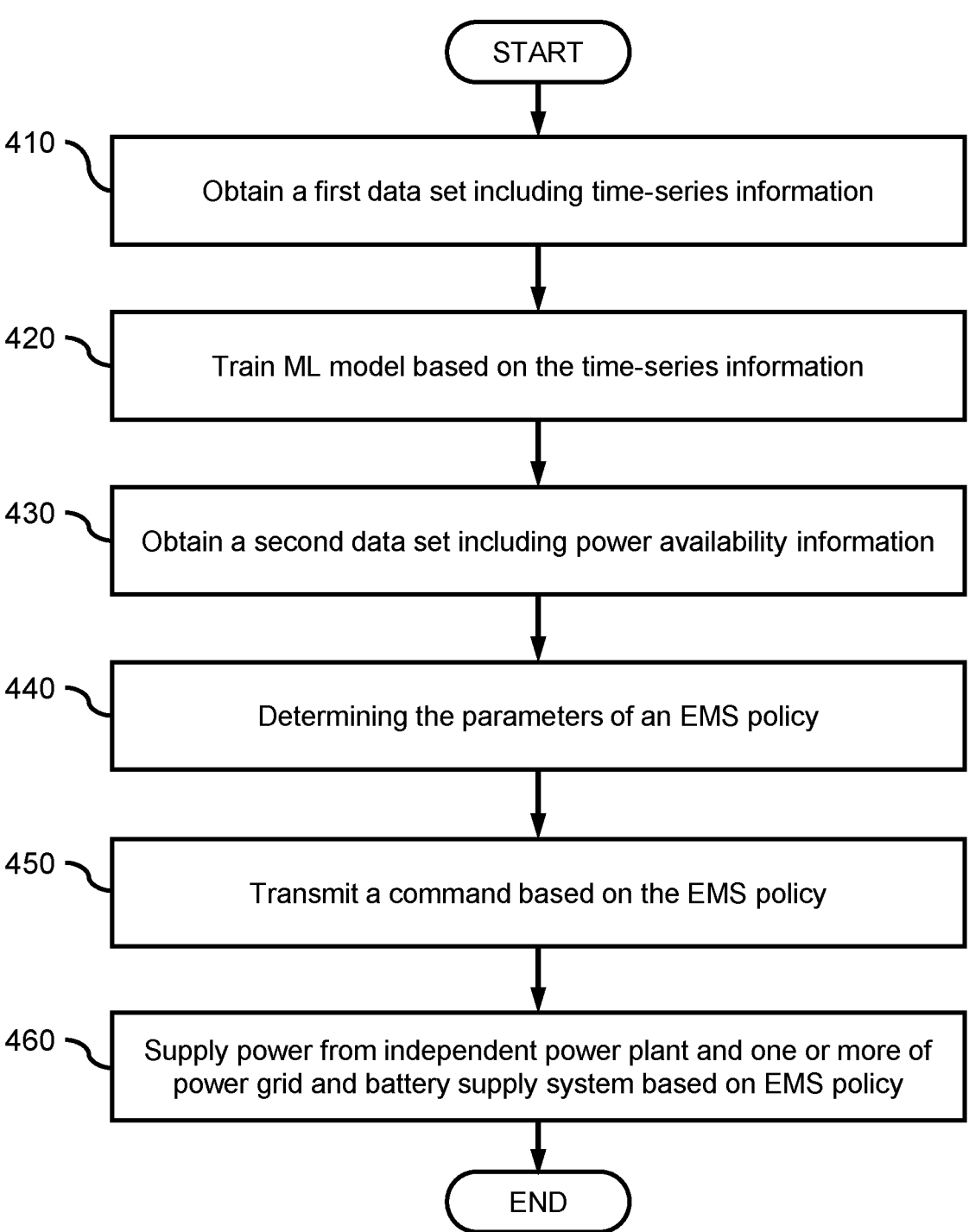

START

410    Obtain a first data set including time-series information

420    Train ML model based on the time-series information

430    Obtain a second data set including power availability information

440    Determining the parameters of an EMS policy

450    Transmit a command based on the EMS policy

460    Supply power from independent power plant and one or more of power grid and battery supply system based on EMS policy

END

*FIG. 4*

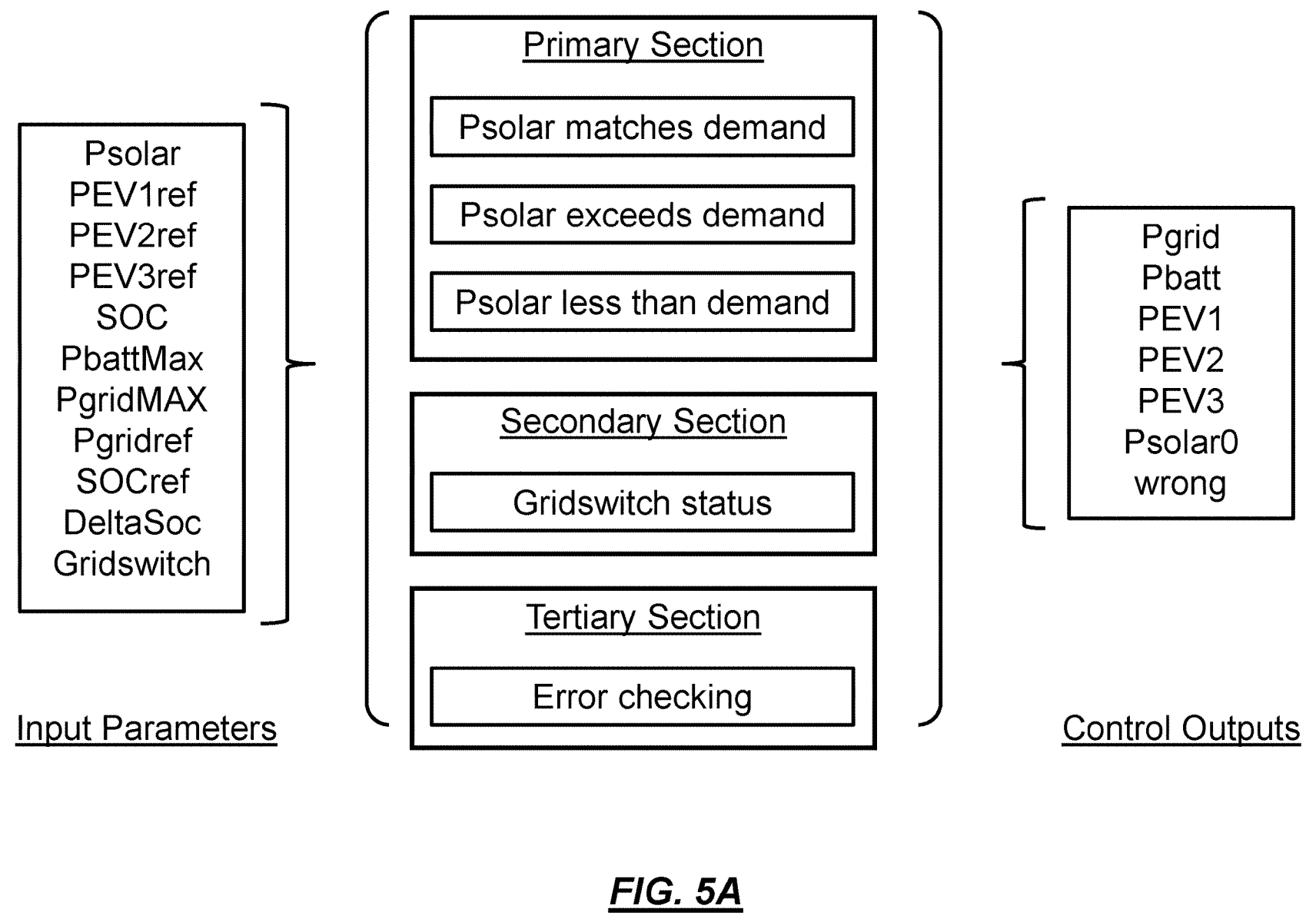

Control Outputs

Pgrid
Pbatt
PEV1
PEV2
PEV3
Psolar0
wrong

Primary Section

Psolar matches demand

Psolar exceeds demand

Psolar less than demand

Secondary Section

Gridswitch status

Tertiary Section

Error checking

Input Parameters

Psolar
PEV1ref
PEV2ref
PEV3ref
SOC
PbattMax
PgridMAX
Pgridref
SOCref
DeltaSoc
Gridswitch

*FIG. 5A*

ENERGY STORAGE CONTROL METHODS FOR OPTIMAL VPP ENERGY MANAGEMENT

BACKGROUND

An intelligent energy system is defined as an approach in which intelligent electricity, thermal, and gas grids are combined with power storage technologies and coordinated to identify synergies between them in order to achieve an optimal solution for each individual sector as well as for the overall energy system. In aggregated systems, different power sources and power consumption units could potentially offer flexibility to the power system. However, in aggregated systems, power production from each power source may not be directly controlled. For example, the power generated by solar power plants (i.e., one or more arrays of solar panels) and wind power plants is dependent on weather conditions, time of day, and/or time of year. To maximize utilization of these variable independent power sources and minimize the risk of failing to satisfy the power demand of a power consumer at any given time, techniques for efficiently managing the power storage technologies are required.

A virtual power plant is a system that connects different components of an intelligent grid ecosystem (power sources, power storage technologies (e.g., battery systems, electric vehicle batteries), and power consumers (e.g., buildings, electric vehicles, intelligent systems)) and coordinates optimal control solutions for the overall power ecosystem. In other words, the aim of the virtual power plant control system is to manage the power flow through the grid components in order to increase the economic performance and sustainability of the grid.

SUMMARY

In general, embodiments of the invention relate to a method of operating a virtual power plant (VPP) controller that manages a power consumer connected to a power grid, a battery storage system, and an independent power plant. The method includes: obtaining a first data set including time-series information for each of power usage of the power consumer, power output of the independent power plant, power output capacity of the power grid, and state of charge (SOC) of the battery storage system; training a machine learning (ML) model based on the time-series information using a ML algorithm, the ML model determines one or more parameters of an energy management system (EMS) policy to satisfy a power demand of the power consumer over a predetermined horizon; obtaining a second data set including power availability information from each of the battery storage system, the power grid, and the independent power plant; determining, by inputting the second data set into the ML model, the one or more parameters of the EMS policy to satisfy the power demand of the power consumer; transmitting a command, based on the EMS policy, to at least one of the power grid, the battery storage system, and the independent power plant to control an amount of power supplied to the power consumer. The EMS policy includes a comparison of the SOC of the battery storage system to the following ranges: SOC-A: $SOC \geq SOCref+\Delta SOC$; SOC-B: $SOC \leq SOCref-\Delta SOC$; SOC-C: $SOCref-\Delta SOC < SOC < SOCref+\Delta SOC$, where SOCref is a charge reference level of the battery storage system, and $\Delta SOC$ is a range parameter that is one of the one or more parameters determined by the ML model. The EMS policy includes different commands based on the SOC satisfying one of the ranges SOC-A, SOC-B, and SOC-C.

In addition, embodiments of the invention relate to a non-transitory computer readable medium storing instructions executable by a computer processor of a virtual power plant (VPP) controller that manages a power consumer connected to a power grid, a battery storage system, and an independent power plant. The instructions comprising functionality for: obtaining a first data set including time-series information for each of power usage of the power consumer, power output of the independent power plant, power output capacity of the power grid, and state of charge (SOC) of the battery storage system; training a machine learning (ML) model based on the time-series information using a ML algorithm, the ML model determines one or more parameters of an energy management system (EMS) policy to satisfy a power demand of the power consumer over a predetermined horizon; obtaining a second data set including power availability information from each of the battery storage system, the power grid, and the independent power plant; determining, by inputting the second data set into the ML model, the one or more parameters of the EMS policy to satisfy the power demand of the power consumer; transmitting a command, based on the EMS policy, to at least one of the power grid, the battery storage system, and the independent power plant to control an amount of power supplied to the power consumer. The EMS policy includes a comparison of the SOC of the battery storage system to the following ranges: SOC-A: $SOC \geq SOCref+\Delta SOC$; SOC-B: $SOC \leq SOCref-\Delta SOC$; SOC-C: $SOCref-\Delta SOC < SOC < SOCref+\Delta SOC$, where SOCref is a charge reference level of the battery storage system, and $\Delta SOC$ is a range parameter that is one of the one or more parameters determined by the ML model. The EMS policy includes different commands based on the SOC satisfying one of the ranges SOC-A, SOC-B, and SOC-C.

In addition, embodiments of the invention relate to a virtual power plant (VPP) controller that manages a power consumer connected to a power grid, a battery storage system, and an independent power plant. The VPP controller includes: a processor configured as a power grid interface that communicates with the power grid, a battery storage interface that communicates with the battery storage system, a power consumer interface that communicates with the power consumer, and a power plant interface that communicates with the independent power plant; and a memory storing an energy management system (EMS) policy and instructions that, when executed, cause the processor to: obtain a first data set including time-series information for each of: power usage of the power consumer, power output of the independent power plant, power output capacity of the power grid, and state of charge (SOC) of the battery storage system; train a machine learning (ML) model based on the time-series information using a ML algorithm, the ML model determines one or more parameters of the EMS policy to satisfy a power demand of the power consumer over a predetermined horizon; obtain a second data set including power availability information from each of the battery storage system, the power grid, and the independent power plant; determine, by inputting the second data set into the ML model, the one or more parameters of the EMS policy to satisfy the power demand of the power consumer; transmit a command, based on the EMS policy, to at least one of the power grid, the battery storage system, and the independent power plant to control an amount of power supplied to the power consumer. The EMS policy includes a comparison of the SOC of the battery storage system to the following ranges: SOC-A: SOC$\geq$SOCref+$\Delta$SOC; SOC-B: SOC$\leq$SOCref-$\Delta$SOC; SOC-C: SOCref-$\Delta$SOC<SOC<SOCref+$\Delta$SOC, where SOCref is a charge reference level of the battery storage system, and $\Delta$SOC is a range parameter that is one of the one or more parameters determined by the ML model. The EMS policy includes different commands based on the SOC satisfying one of the ranges SOC-A, SOC-B, and SOC-C.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 4 shows a flowchart in accordance with one or more embodiments.

FIGS. 5A-5C show an example framework of an EMS policy in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Figure 1A:
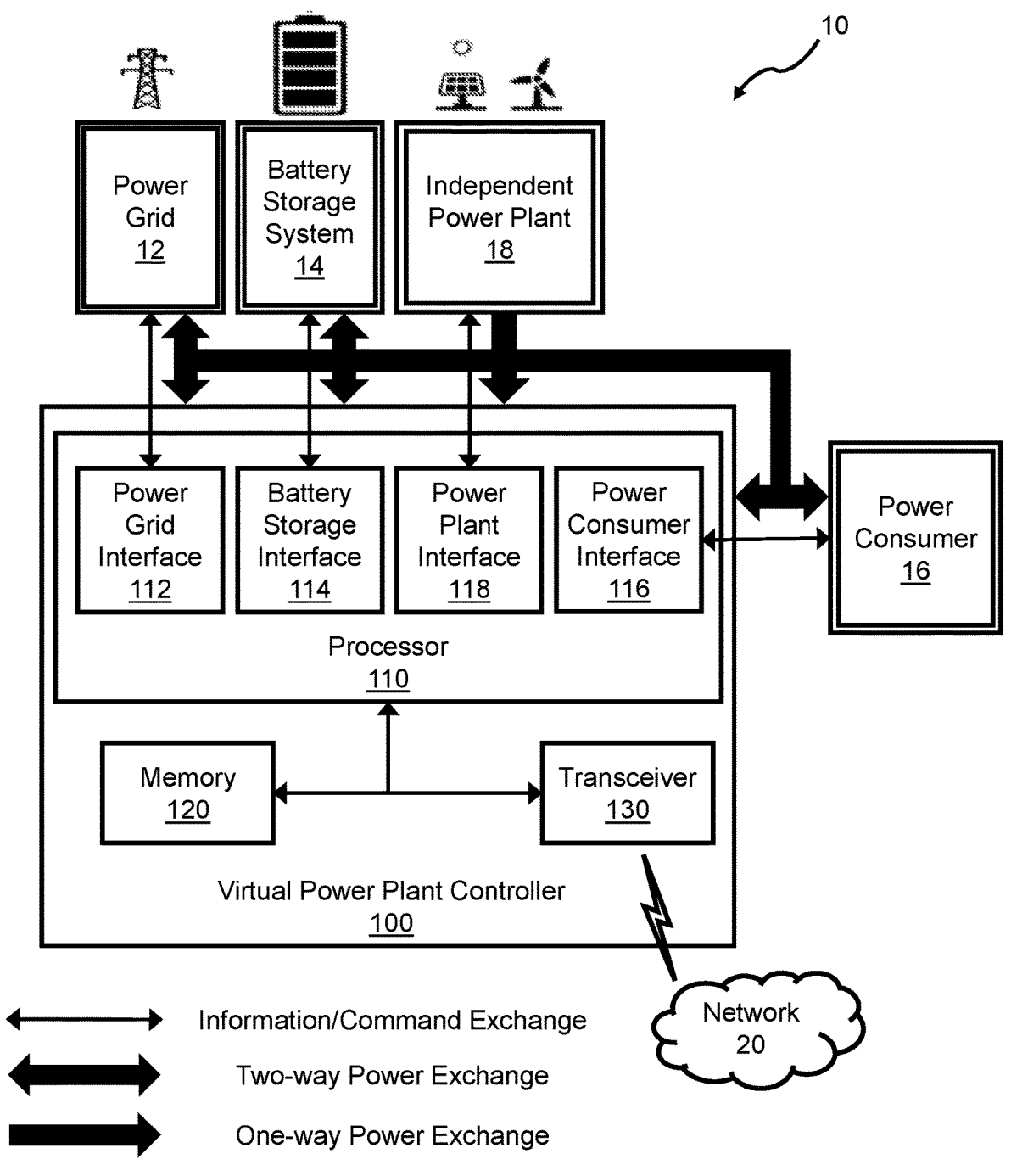
FIGS. 1A-1B shows examples of a VPP intelligent grid system in accordance with one or more embodiments.
Figure 1B:
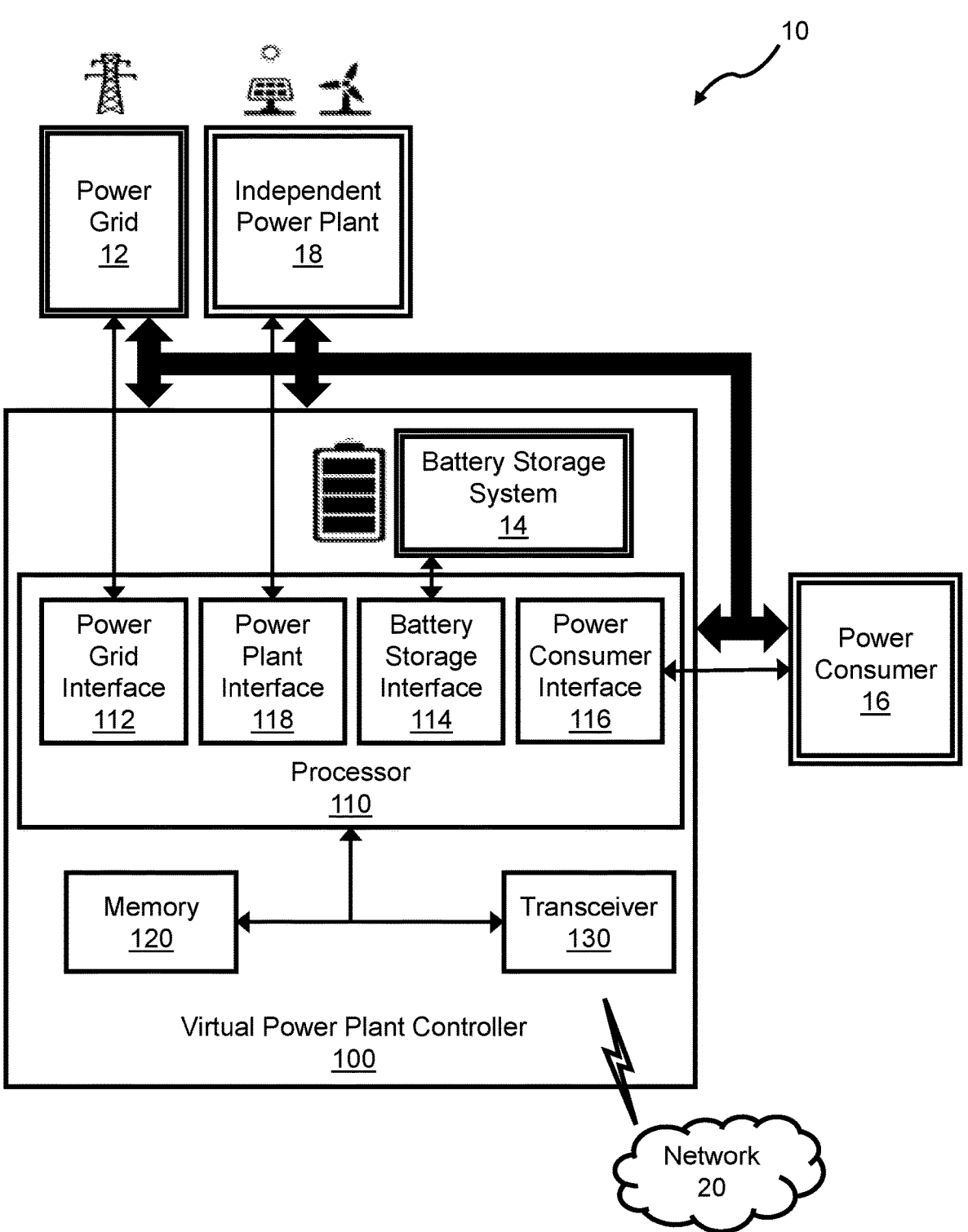

FIGS. 1A-1B show examples of a VPP intelligent grid system 10 in accordance with one or more embodiments.

As shown in FIG. 1A, in one or more embodiments, a VPP intelligent grid system 10 includes a power grid 12, a battery storage system 14, a power consumer 16, an independent power plant 18, a network 20, and the VPP controller 100. The VPP controller 100 connects together and manages power distribution between power sources and power consumers in the VPP intelligent grid system 10. The power grid 12 (e.g., an alternating current (AC) power network) is a unique subsystem in that it can deliver any required amount of power to the VPP intelligent grid system 10. However, the VPP controller 100 may seek to minimize an economic cost of the power grid 12 (e.g., reduce usage and dependence on the power drawn from power grid 12) by optimally managing any independent power sources and energy storage systems.

To guarantee capacity and reliability requirements for any power consuming subsystems connected to the VPP intelligent grid system 10, the VPP intelligent grid system 10 may include a battery storage system 14 that stores and provides power on demand in an optimal manner. Furthermore, an independent power plant 18 (e.g., a solar power plant providing power from a solar radiation source) may deliver power to the VPP intelligent grid system 10 to further reduce the amount of power utilized from the power grid 12. Furthermore, certain end-user subsystems equipped with batteries (e.g., EVs and home battery systems) may be utilized by the VPP intelligent grid system 10 to store or release power.

Each of the components of the VPP intelligent grid system 10 is described in further detail below.

The VPP controller 100 has multiple components, and may include, for example, a processor 110, a memory 120, and a transceiver 130. The processor 110 may be an integrated circuit (e.g., one or more cores, or micro-cores) for processing instructions and data sets, training a machine learning (ML) model, determining power condition information, and generating control commands, as described in further detail below. The memory 120 may be random access memory (RAM), cache memory, flash memory, or a storage drive that stores information for the VPP controller 100. The transceiver 130 may be a wired or wireless communications circuit (e.g., data port, antenna(s) array, communications bus) that allows the VPP controller 100 to communicate with an external device, such as a user device, a subsystem 12, 14, 16, 18 or a network 20; each of which may provide supplemental information to guide or control the VPP controller 100 from outside of the feedback loops in the VPP intelligent grid 10. Although the VPP controller 100 in FIG. 1A is shown as having three components (110, 120, and 130), in other embodiments of the invention, the VPP controller 100 may have more components (e.g., integrated memory, clock, analog to digital converter, communication bus) or fewer components. Furthermore, the functionality of each component described above may be shared among multiple components or performed by a different component. For example, each component (110, 120, and 130) may be utilized multiple times in serial or parallel to carry out repeated, iterative, or parallel operations.

The VPP controller 100 may also include one or more input device(s) (not shown), such as a button, touchscreen, camera, microphone, or any other type of input device for the user to provide information directly to the VPP controller 100 rather than through the transceiver 130. Further, the VPP controller 100 may include one or more output device(s) (not shown), such as a screen (e.g., a liquid crystal display (LCD), light emitting diode (LED) display, organic light emitting diode (OLED) display, or any other display device to provide information directly to the user rather than through the transceiver 130. One or more of the output device(s) may be the same or different from the input device(s). The VPP controller 100 may connect to a network 20 (e.g., a local area network (LAN), a wide area network (WAN) such as the Internet, mobile network, or any other type of network) via the transceiver 130 to exchange information between the VPP controller 100 and any device external to the VPP intelligent grid 10.

Further, one or more processing elements of the VPP controller 100 may be located at a remote location and may be connected to the other elements over the network 20. For example, one or more embodiments of the invention may be implemented by spreading the information processing across a distributed system having a plurality of nodes that include distinct computing and storage devices (i.e., cloud computing). Each node may correspond to a computer processor with associated physical memory. Each node may alternatively correspond to a computer processor or micro-core of a computer processor with shared memory and/or resources.

Software instructions executed by the VPP controller 100 may be in the form of computer readable program code to perform embodiments of the invention and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

The processor 110 of the VPP controller 100 is connected with subsystems of the VPP intelligent grid components (i.e., local controllers/processors) to aid in controlling each intelligent grid component. In one or more embodiments, the processor 110 defines set-points that control power flow between each VPP intelligent grid component. In one or more embodiments, processor 110 of the VPP controller 100 is the centralized policy manager for the different VPP intelligent grid component. The processor 110 has multiple functional components, and may include, for example, a power grid interface 112, a battery storage interface 114, a power consumer interface 116, and a power plant interface 118.

The power grid interface 112 communicates with the power grid 12 to exchange power grid information (e.g., a reference power level, connection type/status information, price information) and consequent control commands (e.g., power requests, shut-down/disconnect requests). Furthermore, the power grid interface 112 contributes to the training of a ML model by modelling the power grid 12 according to the power grid specifications and operating conditions.

The battery storage interface 114 communicates with battery storage system 14 to exchange battery condition information (e.g., state of charge information, connection type/status information, battery charge cycle number) and consequent control commands (e.g., power requests, shut-down/disconnect requests). Furthermore, the battery storage interface 114 contributes to the training of a ML model by modelling the battery storage system 14 according to the battery specifications and operating conditions.

The power consumer interface 116 communicates with the power consumer 16 to exchange information (e.g., power demand levels, connection type/status information, charging rate information) and consequent control commands (e.g., power requests, shut-down/disconnect requests). Furthermore, the power consumer interface 116 contributes to the training of a ML model by modelling the power consumer 16 according to its specifications and operating conditions (e.g., usage statistics, min/max power transfer rates, charging rate of a fast charging or a slow electric vehicle charging station).

The power plant interface 118 communicates with the independent power plant 18 to exchange information (e.g., solar power conversion efficiency parameters, solar panel health information, connection type/status information, weather information) and consequent control commands (e.g., power requests, shut-down/disconnect requests). Furthermore, the power plant interface 118 contributes to the training of a ML model by modelling the independent power plant 18 according to its specifications and operating conditions.

Although the VPP intelligent grid system 10 in FIG. 1A is shown as having 6 components (12, 14, 16, 18, 20 and 100), in other embodiments of the invention, a VPP intelligent grid system 10 may have more, fewer, or different components. In particular, while the above embodiments have been described with respect to a solar power plant, the present invention is not limited to this configuration and the independent power plant 18 may be any type of suitable power generation facility (e.g., wind power plant, hydro-power plant, geothermal power plant).

The functionality of each component of the VPP intelligent grid system 10 described above may be shared among multiple instances of a single type of component (e.g., a plurality of distributed battery storage systems 14). Furthermore, the functionality of each component of the VPP intelligent grid system 10 described above may be shared among multiple components of different types. For example, the power consumer 16 may act as a battery storage system 14 to supply power to the VPP intelligent grid (exporting energy from an EV at an EV charging station).

As another example, FIG. 1B shows an example VPP intelligent grid system in accordance with one or more embodiments. One or more embodiments of the VPP intelligent grid system 10 may include an integrated battery storage system 14 in the VPP controller 100. In other words, the VPP controller 100 may simultaneously function as an energy management system (EMS) and as a battery management system (BMS) for the VPP intelligent grid 10.

Figure 2A:
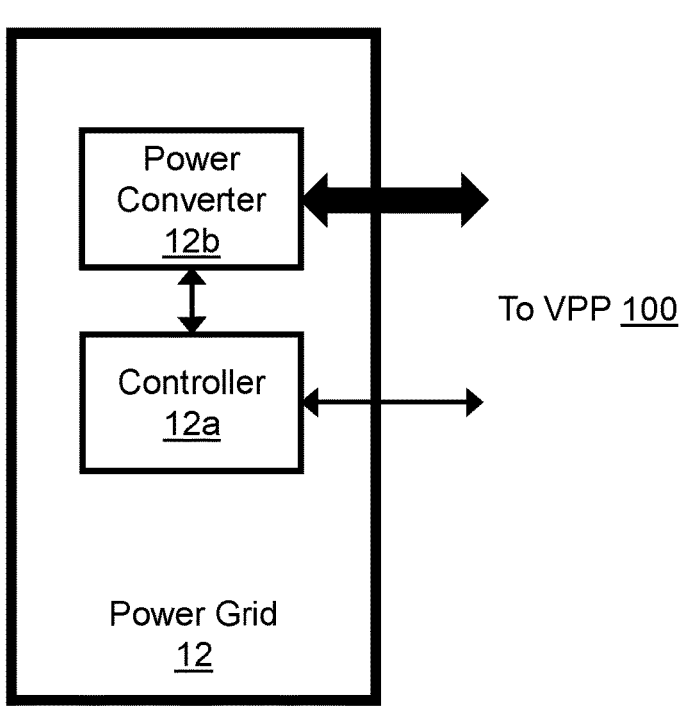
FIG. 2A shows an example power grid in accordance with one or more embodiments.

FIG. 2A shows an example power grid 12 in accordance with one or more embodiments.

The power grid 12 of the VPP intelligent grid system 10 includes the infrastructure of a power network that can import any required amount of power to the VPP intelligent grid system 10. Further, when required or financially desirable, power can be exported (i.e., sold) to the power grid 12 by the VPP controller 100.

The power grid 12 includes a controller 12a (e.g., a processor) that communicates with the VPP controller 100 to coordinate the export and import of power to and from the power grid 12. The controller 12a controls a power converter 12b that facilitates the export and import of power between the power grid 12 and the rest of the VPP intelligent grid system 10. Note, the power flow is bidirectional. Further, the communication link between the controller 12a and the power grid interface 112 of the VPP controller 100 is bidirectional to exchange power grid information (e.g., a reference power level, connection type/status information, price information) and consequent control commands.

The power converter 12b may be an AC/DC power converter capable of operating in both rectified and inverter modes in order to permit the power to flow from/to the power grid 12 and the VPP intelligent grid system 10. The power converter 12b may switch operational modes based on control information received from the VPP controller 100. For example, the power converter 12b may have a bidirectional AC/DC power converter topology. It may transfer power between a three-phase AC voltage supply and a DC voltage bus. For example, the power converter 12b may comprise six transistors (e.g., IGBT-Diode switches) connected with the three-phase AC voltage supply through inductance-resistance series filters. A DC capacitor may be connected across the DC voltage bus to keep the voltage constant. The bidirectional AC-DC converter operates in two modes. The first mode is rectifier mode, in which the bidirectional AC-DC converter operates as a front-end rectifier and allows power transfer from the three-phase AC voltage end to the DC voltage bus. The second mode is inverter mode, in which the bidirectional AC-DC converter operates as a voltage source inverter and allows power flow from DC voltage bus to the three-phase AC voltage.

The control of power converter 12b may be based on voltage-oriented control (VOC) scheme, which decomposes the active and reactive power in stationary a-β coordinate and synchronizes the powers with rotating d-q reference frames by characterizing the current control loops using proportional integral (PI) controllers. Moreover, a virtual-flux-oriented control could be considered which also uses the PI controllers. The major limitation of these control schemes is tuning the PI controllers which further affects the coordinate transform accuracy.

Furthermore, a direct power control (DPC) scheme may be applied for grid-tied AC-DC converter based on the direct torque control (DTC) principle, which also uses the PI controllers. In order to improve the performance of the power converter 12b, a look-up table (LUT) based direct power control (DPC) scheme may be implemented. In these policies, the switching action of the power converter 12b may be performed based on a predefined switching state table on the basis of active and reactive power characteristics. This look-up table-based DPC method may produce undesirable harmonic spectrums. Alternatively, different control policies may be employed (e.g., Sliding Mode, Fuzzy Logic, or Model Predictive Control).

In one or more embodiments, the power converter 12b may further include a DC/DC power converter for voltage stepping or converting between different voltage levels of different components in the VPP intelligent grid system 10.

Figure 2B:
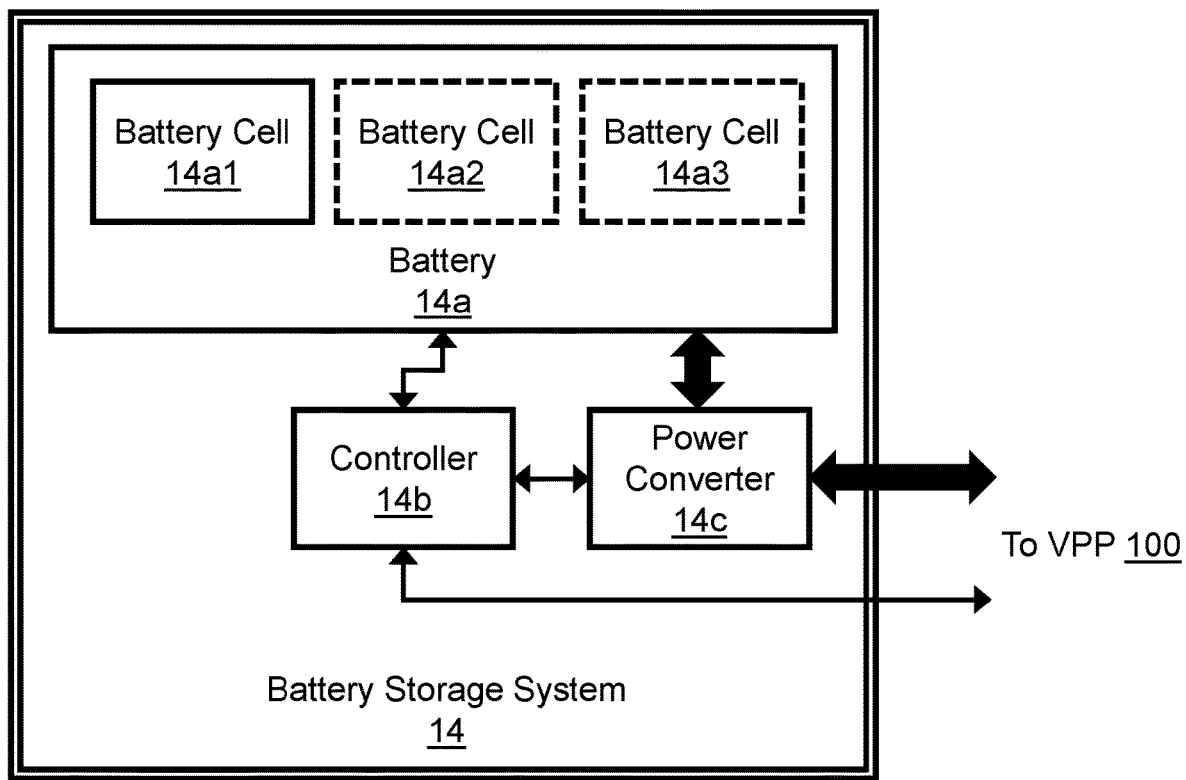
FIG. 2B shows an example battery storage system in accordance with one or more embodiments.

FIG. 2B shows an example battery storage system 14 in accordance with one or more embodiments.

The battery storage system 14 includes one or more batteries 14a that represent a power storage system for accumulating or releasing power from/to the VPP intelligent grid system 10. Each battery 14a includes one or more battery cells 14a1-3 operating together to provide the required storage capacity and voltage of the entire battery 14a. The battery 14a may be Lithium-based. However, embodiments of the present invention are not limited to Lithium-based batteries and any appropriate rechargeable battery technology or chemistry may be employed by the battery storage system 14.

The battery storage system 14 is scalable to any appropriate facility size with large capacity batteries playing a key role in future energy scenarios with fluctuating power supply. For example, electric vehicle batteries may be utilized as a "microscale" battery storage system 14 for a household (e.g., off-grid homes). On the other hand, the battery storage system 14 may be scaled up to massive arrays of battery banks to help power large scale commercial or manufacturing facilities. The battery storage system 14 may be charged from the power grid 12 when the price of electricity is cheaper (i.e., below a reference energy cost) to achieve load leveling and peak shaving in the power grid 12 consumption in a cost effective manner.

The battery storage system 14 includes a controller 14b (e.g., a processor) that regulates the power flow between battery cells 14a1-3 as well as charging and discharging phases according to battery specifications and operating conditions. Furthermore, the controller 14b communicates with the VPP controller 100 to coordinate the export and import of power to and from the battery 14a. The controller 14b controls a power converter 14c that facilitates the export and import of power between the battery 14a and the rest of the VPP intelligent grid system 10. Note, the power flow is bidirectional, due to the possibility to store and release power from/to the VPP intelligent grid system 10 according to instantaneous operating conditions. Further, the communication link between the controller 14b and the battery storage interface 114 of the VPP controller 100 is bidirectional to exchange battery condition information (e.g., state of charge information, connection type/status information, battery charge cycle number) and consequent control commands.

Similar to the power converter 12b, the power converter 14c may be an AC/DC power converter capable of operating in both rectified and inverter modes in order to permit power flow between the battery 14a and the power grid 12 of the VPP intelligent grid system 10. Furthermore, the power converter 14c may include a DC/DC power converter for voltage stepping or converting between different voltage levels of different components in the VPP intelligent grid system 10.

Figure 2C:
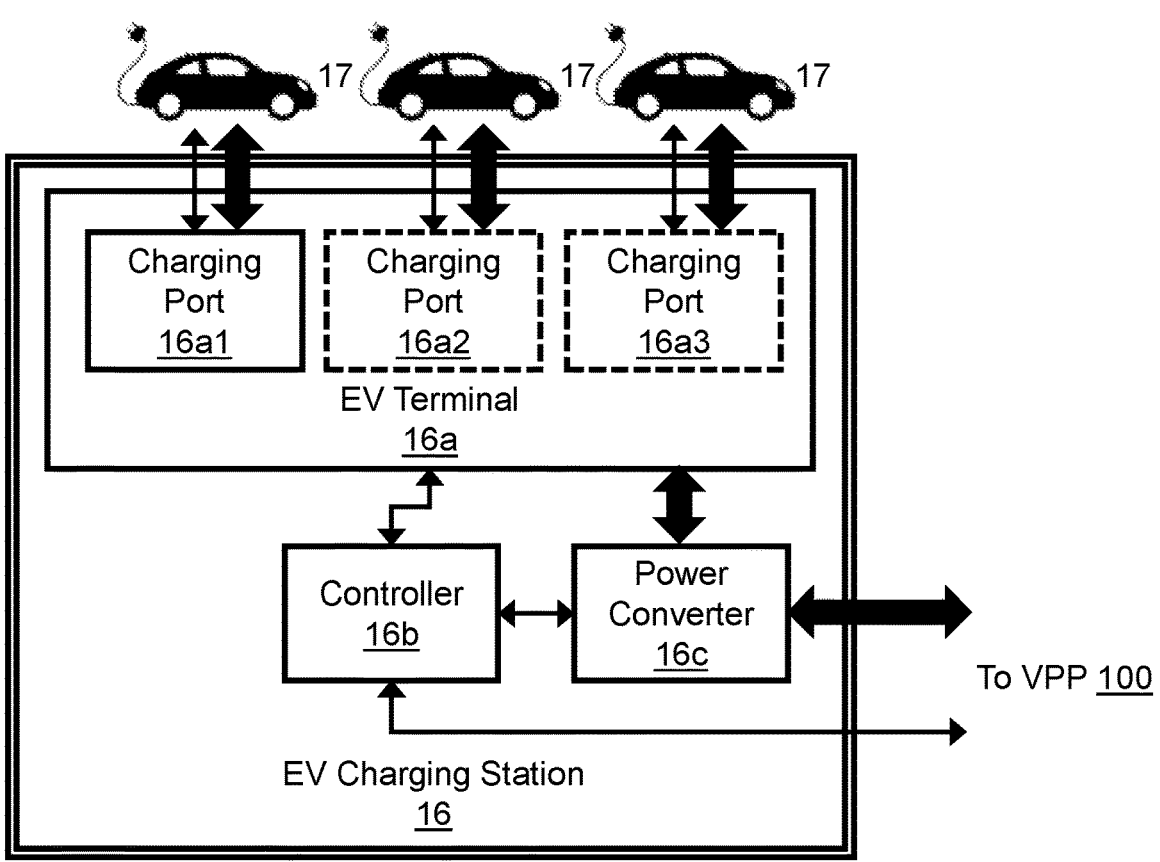
FIG. 2C shows an example power consumer in accordance with one or more embodiments.

FIG. 2C shows an example power consumer 16 in accordance with one or more embodiments.

In one or more embodiments, the power consumer 16 may be an electric vehicle (EV) charging station 16 that includes one or more EV terminals 16a configured to connect to EVs 17. Each EV terminal 16a may include one or more charging ports 16a1-3 for charging or discharging a single EV 17. While an EV 17 typically relies on the VPP intelligent grid system 10 as power provider, as discussed above, the battery within the EV 17 may also be used as a "microscale" battery storage system 14 to provide power back to the VPP intelligent grid system 10 through the EV terminal 16a. For example, when financially desirable (e.g., electricity prices surge during high demand periods), an EV 17 can act as a power source in the VPP intelligent grid system 10.

Because the EVs are generally expected to be grid-connected and available for long periods of the time (e.g., connected at home overnight or connected in a parking lot during business hours) with a high degree of flexibility, an EV 17 can function as a quick-response power storage unit with bi-directional power flow capabilities. This flexibility can support a set of power services to influence the timing and rate of power distribution between EV battery and the VPP intelligent grid system 10 to yield benefits for the user, system, and society. For example, these services could involve frequency regulation, synthetic inertia, adaptive charging, network balancing, overvoltage management, line overloading, charging flexibility, and management.

The EV charging station 16 includes a controller 16b (e.g., a processor) that communicates with the VPP controller 100 to coordinate the export and import of power to and from the EV terminal 16a. The controller 16b controls a power converter 16c that facilitates the export and import of power between the EV terminal 16a and the rest of the VPP intelligent grid system 10. Note, the power flow is bidirectional. Further, the communication link between the controller 16b and the power consumer interface 116 of the VPP controller 100 is bidirectional to exchange information (e.g., EV power levels, connection type/status information, EV charging price information) and consequent control commands. The information may further include a connection schedule (user generated or tracked by the EV terminal 16a) for when the EV 17 is expected to be connected to the system. Furthermore, the information may include a user-defined amount of power and/or conditions (e.g., price, minimum maintained charge, maximum depth of discharge) under which power is allowed to be extracted from the EV 17.

Similar to the power converter 12*b*, the power converter 16*c* may be an AC/DC power converter capable of operating in both rectified and inverter modes in order to permit power flow between the EV terminal 16*a* and the power grid 12 of the VPP intelligent grid system 10. Furthermore, the power converter 16*c* may include a DC/DC power converter for voltage stepping or converting between different voltage levels of different components in the VPP intelligent grid system 10. Furthermore, EV charging stations 16 may be deployed with one or more types of power converters 16*c* with different capabilities (e.g., peak power ratings) to provide further flexibility and granularity to the above references support services.

Although the above embodiments have been described with respect to an EV charging station as the power consumer 16, the present invention is not limited to this configuration and the power consumer 16 may be any type of facility that consumes power (e.g., a commercial building, a residential building, a manufacturing facility) and is connected to the VPP intelligent grid system 10.

Figure 2D:
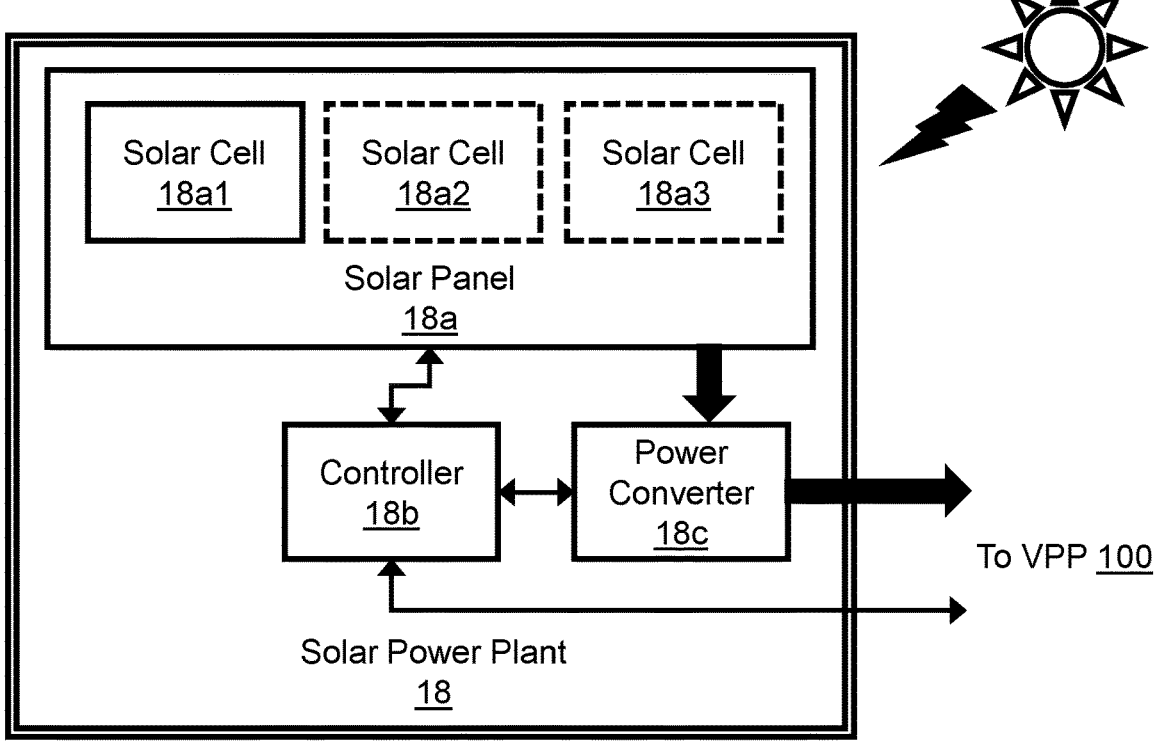
FIG. 2D shows an example of an independent power plant in accordance with one or more embodiments.

FIG. 2D shows an example independent power plant 18 in accordance with one or more embodiments.

In one or more embodiments, the independent power plant 18 is a solar power plant 18. This type of energy source is advantageous to include in a VPP intelligent grid system 10 because of the low maintenance requirements, limited infrastructure installation cost (e.g., installation on roofs without audible noise during operations), and predictable power dynamics over required control horizons. In particular applications, the solar power plant 18 could be considered to operate in conjunction with wind power systems in suitable environmental and geographical conditions.

The solar power plant 18 includes one or more solar panels 18*a* that convert solar radiation into DC power that is provided to the VPP intelligent grid system 10. Each solar panel 18*a* includes one or more solar cells 18*a*1-3 operating together in series or parallel to guarantee the specified production capacity of the entire solar panel 18*a*.

The solar power plant 18 includes a controller 18*b* (e.g., a processor) that communicates with the VPP controller 100 to coordinate the export of power from the solar panel 18*a*. The controller 18*b* controls a power converter 18*c* that facilitates the export of power from the solar panel 18*a* and the rest of the VPP intelligent grid system 10. Note, the power flow is unidirectional. The communication link between the controller 18*b* and the power plant interface 118 of the VPP controller 100 is bidirectional to exchange information (e.g., solar power conversion efficiency parameters, solar panel health information, connection type/status information, weather information) and consequent control commands.

Similar to the power converter 12*b*, the power converter 18*c* may be an AC/DC power converter capable of operating in both rectified and inverter modes in order to permit power flow between the solar panel 18*a* and the power grid 12 of the VPP intelligent grid system 10. Furthermore, the power converter 18*c* may include a DC/DC power converter for voltage stepping or converting between different voltage levels of different components in the VPP intelligent grid system 10.

In general, the power converter 18*c* stabilizes the output voltage generated from the solar panel 18*a* to a prescribed DC value that is compatible with the VPP intelligent grid system 10. The power converter 18*c* is configured and controlled by the controller 18*b* to extract the maximum amount of power from the solar panel 18*a* at any time. The maximum extractable power from the solar panel 18*a* depends not only on the strength of the solar irradiation but also on the operating point of the energy conversion system. In particular, a Maximum Power Point Tracking (MPPT) system may be used to maximize system efficiency and minimizes the return of investment on the solar plant installation. Maximum power extraction may be achieved by driving DC-DC converter duty-cycle. In the considered system, a non-isolated converted may be used, where the term isolation refers to the electric barriers separating input and output of the converter. Several non-isolated DC-DC converters can be used for solar plant applications (e.g., buck, boost, and buck-boost) characterized by different topologies, operational regions, advantages, and disadvantages.

As discussed above, although the above embodiments have been described with respect to a solar power plant, the present invention is not limited to this configuration and the independent power plant 18 may be any type of suitable power generation facility (e.g., wind power plant, hydropower plant, geothermal power plant).

Figure 3A:
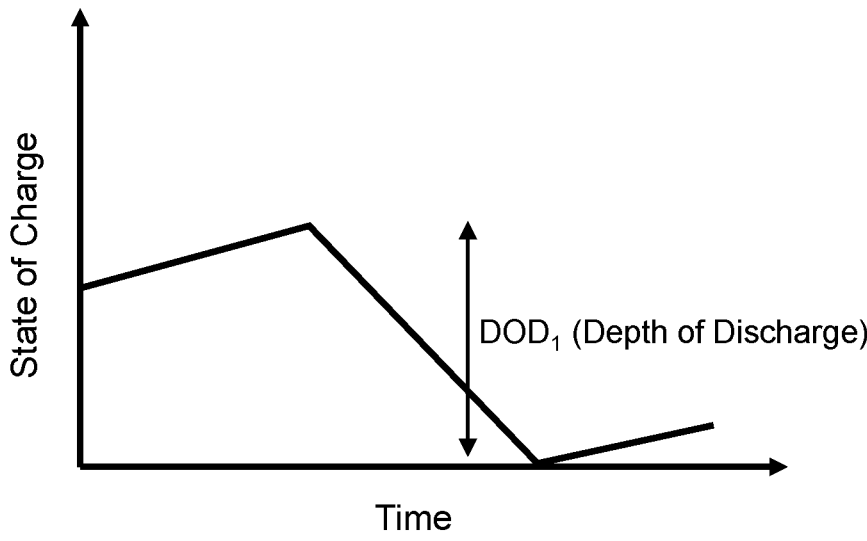
FIGS. 3A-3B show an example of improving power management in an intelligent grid system in accordance with one or more embodiments.
Figure 3B:
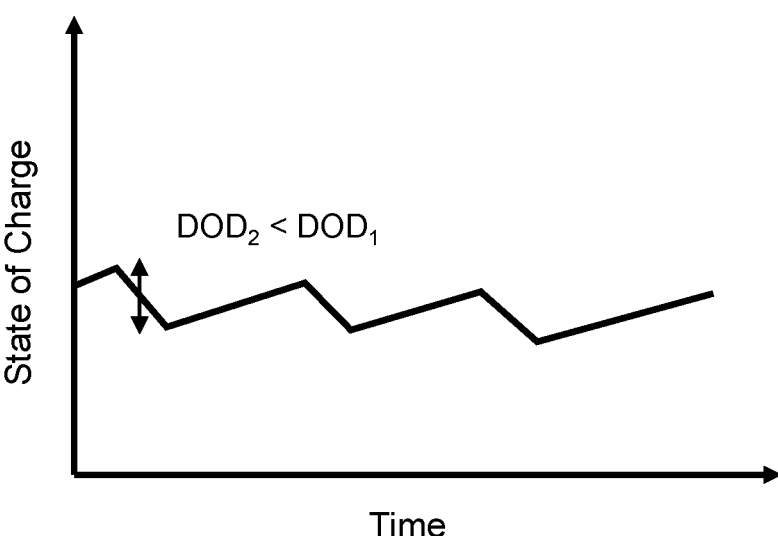

FIGS. 3A-3B show an example of improving power management in an intelligent grid system in accordance with one or more embodiments.

The state of charge (SOC) of a battery storage system may be represented as a percentage of the total charge capacity. The depth of discharge (DOD) is a measure of the change in SOC over a given timeframe during usage of the battery storage system 14. Battery cells typically age more slowly when operated with a lower DOD (e.g., logarithmic relationship to battery life span). Similarly, charge and discharge rates (e.g., power import and export rates) can affect the health of the battery storage system 14. Therefore, increasing the lifetime (e.g., measured in a number of full capacity charge/discharge cycles) and cost-effectiveness of the battery storage system can be achieved in part by minimizing large DOD events and delaying costly battery replacements.

In FIG. 3A, a high DOD (approximately 80%) of the battery storage system 14 causes the battery storage system to degrade faster (e.g., estimated 30% decrease in storage capacity in <11 years). Further, when the SOC is allowed to approach 0%, the battery storage system 14 runs the risk of being unable to supply power during emergency situations or unplanned power usages until recovering some charge (e.g., waiting some hours for charging from independent power plant 18 or consuming extra power from the power grid 12).

As shown in FIG. 3B, the operation of the battery storage system 14 can be improved by keeping the SOC far from reaching 0% and 100%. By optimizing an EMS policy to operate the battery storage system 14 with a low DOD, the lifetime of the battery storage system 14 can be greatly extended. In FIG. 3B, the EMS policy implemented by the VPP controller 100 regulates usage of the battery storage system 14 to minimize the DOD (approximately 12%). As a result, the battery life is estimated to be extended to +29 years. Furthermore, by operating with a low depth of discharge (i.e., the SOC always far from 0%), the battery storage system 14 readily has capacity to handle emergency and unplanned usage.

To improve performance, such as implementing the above non-limiting examples in FIG. 3B, a VPP controller 100 employs a control method that utilizes a training dataset from each of the connected components of the intelligent grid system 10 to train a ML model that can optimally coordinate the power distribution between the components.

In one or more embodiments, the ML model determines parameters of the EMS policy to satisfy a power demand of the power consumer 16 over a predetermined horizon while maximizing lifetime performance of a battery storage system 14. For example, the ML model may determine an optimal range of the SOC (e.g., defined by a charge reference level and a range parameter, defined by upper and lower bounds) to satisfy power demand in a VPP intelligent grid system 10 while limiting degradation of the battery storage system 14. Alternatively, or in addition, the ML model may determine other parameters of the EMS policy that affect the usage of the battery storage system 14 (e.g., reference power allocation from the power grid 12 that are used to charge the battery storage system 14).

In general, embodiments of the disclosure include a method of operating a VPP system, a non-transitory computer readable medium storing instructions executable by a computer processor of a VPP system, and a VPP controller that train and apply a ML model to modify and update an EMS policy of an intelligent grid system (e.g., limitations/instructions/rules for power exchange between a power grid, a battery storage system, a power plant, and a power consumer).

FIG. 4 shows a flowchart in accordance with one or more embodiments. One or more of the individual processes in FIG. 4 may be performed by the VPP controller 100 of FIGS. 1A-1B, as described above. One or more of the individual processes shown in FIG. 4 may be omitted, repeated, and/or performed in a different order than the order shown in FIG. 4. Accordingly, the scope of the invention should not be limited by the specific arrangement as depicted in FIG. 4.

At 410, the processor 110 of the VPP controller 100 obtain a first data set including time-series information from components of the VPP intelligent grid system 10. The first data set may include information from each of the power grid 12, the battery storage system 14, the power consumer 16, and the power plant 18. In one or more embodiments, the time-series information includes: power usage of the power consumer 16; power output of the independent power plant 18; power output capacity of the power grid 12; and state of charge (SOC) of the battery storage system 14.

The time-series information from each component of the VPP intelligent grid system 10 may be historical operational information over a predetermined time period. In one or more embodiments, the first data set includes time-series information from one or more time periods. For example, a first portion of the time-series information may provide short-term data (e.g., between one hour to one week), a second portion of the time-series information may provide medium-term data (e.g., between one week to one year), and a third portion of the time-series information may provide long-term data (e.g., more than one year).

The operational information may include power input and/or output levels, maintenance schedules, connection type/status (e.g., connected to grid, disconnected from grid, connected with limited capacity, etc.), reliability reports, weather data, or any other appropriate information regarding the operation of the individual components.

The first data set may be retrieved from each component of the VPP intelligent grid 10 by its corresponding interface of the processor 110 (i.e., the power grid interface 112 communicates with the power grid 12, the battery storage interface 114 communicates with the battery storage system 14, the power consumer interface 116 communicates with the power consumer 16, and the power plant interface 118 communicates with the independent power plant 18).

At 420, the processor 110 trains a machine learning (ML) model based on the time-series information using a ML algorithm. In one or more embodiments, the ML model may include a digital twin of the physical VPP intelligent grid system 10 that emulates performance over one or more future horizons (e.g., short-term, medium-term, long-term simulations to provide performance metrics that feedback into training). The digital twin may simulate each component of the VPP intelligent grid 10 by utilizing the corresponding interface of the processor 110 (i.e., the power grid interface 112 is configured to simulate the power grid 12, the battery storage interface 114 is configured to simulate the battery storage system 14, the power consumer interface 116 is configured to simulate the power consumer 16, and the power plant interface 118 is configured to simulate the independent power plant 18). The processor 110 may validate the ML model by comparing generated data (e.g., augmented, or synthetic data) to a portion of the time-series information in the first data set. The ML model is discussed in further detail with respect to FIG. 6 below.

In one or more embodiments, the ML model may be configured to determine one or more parameters of an energy management system (EMS) policy to satisfy a power demand of the power consumer 16 over a predetermined horizon. The EMS policy is discussed in further detail with respect to FIGS. 5A-5C below.

At 430, the processor 110 obtains a second data set including power availability information from components of the VPP intelligent grid system 10. The second data set may include power availability information from each of the battery storage system 14, the power grid 12, and the independent power plant 18. Similar to the above, the information may be retrieved from each component of the VPP intelligent grid system 10 by its corresponding interface of the processor 110.

The information in the second data set may be live (i.e., real-time) and/or recent time-series operational information from each component of the VPP intelligent grid system 10. The operational information may include input/output power levels, connection type/status, equipment status/reliability reports, weather data, or any other appropriate information regarding the operation of the individual components of the VPP intelligent grid system 10.

At 440, the processor 110 determines one or more parameters of the EMS policy to satisfy the power demand of the power consumer 16 over a predetermined horizon. In one or more embodiments, each of the one or more parameters may be implemented in the EMS policy for a corresponding predetermined horizon (e.g., each parameter determined by the ML model may be implemented for one or more of a short-term timescale, a medium-term timescale, a long-term timescale). Examples of the one or more parameters determined by inputting the second data set into the ML model are discussed in further detail with respect to FIGS. 5B-5C below.

At 450, the processor 110 transmits a command based on the EMS policy. In one or more embodiments, the command includes instructions to at least one of the power grid 12, the battery storage system 14, and the independent power plant 18 to control an amount of power supplied to the power consumer 16. Furthermore, the command may include instructions to control power supplied to one or more of the power grid 12 and the battery storage system 14. Note, the bi-directional power flow for each of the power grid 12, the battery storage system 14, and/or the power consumer 16 may be controlled by the command from the VPP controller 100 to balance power across the VPP intelligent grid system 10. In addition, the unidirectional power flow out of the independent power plant 18 may be regulated by the command from the VPP controller 100. Examples of the command are discussed in further detail with respect to FIGS. 5B-5C below.

At 460, the VPP intelligent grid system 10 supplies power from independent power plant 18 and one or more of power grid 12 and battery storage system 14 based on the EMS policy. In other words, each command issued by the VPP controller 100 may adjust an operation of at least one of the power grid 12, the battery storage system 14, and the independent power plant 18 to reduce power losses, increase power economy, and generally balance power availability across the VPP intelligent grid system 10.

For example, the command may include one or more of the following: an instruction to the power grid 12 to change a reference power level (e.g., an output capacity threshold, a minimum/maximum output capacity); an instruction to the battery storage system 14 to change the state of charge by charging or discharging the battery 14*a* (e.g., to export power to power grid 12 or power consumer 16); an instruction to the regulate power usage by the power consumer 16 or export power from the power consumer 16 (e.g., discharge an EV during to support the power grid 12 during peak power consumption periods); an instruction to provide an amount of power from one component of the VPP intelligent grid system 10 to another component of the VPP intelligent grid system 10. These examples are for explanatory purposes only and not intended to limit the scope of the disclosed technology.

Figure 5B:
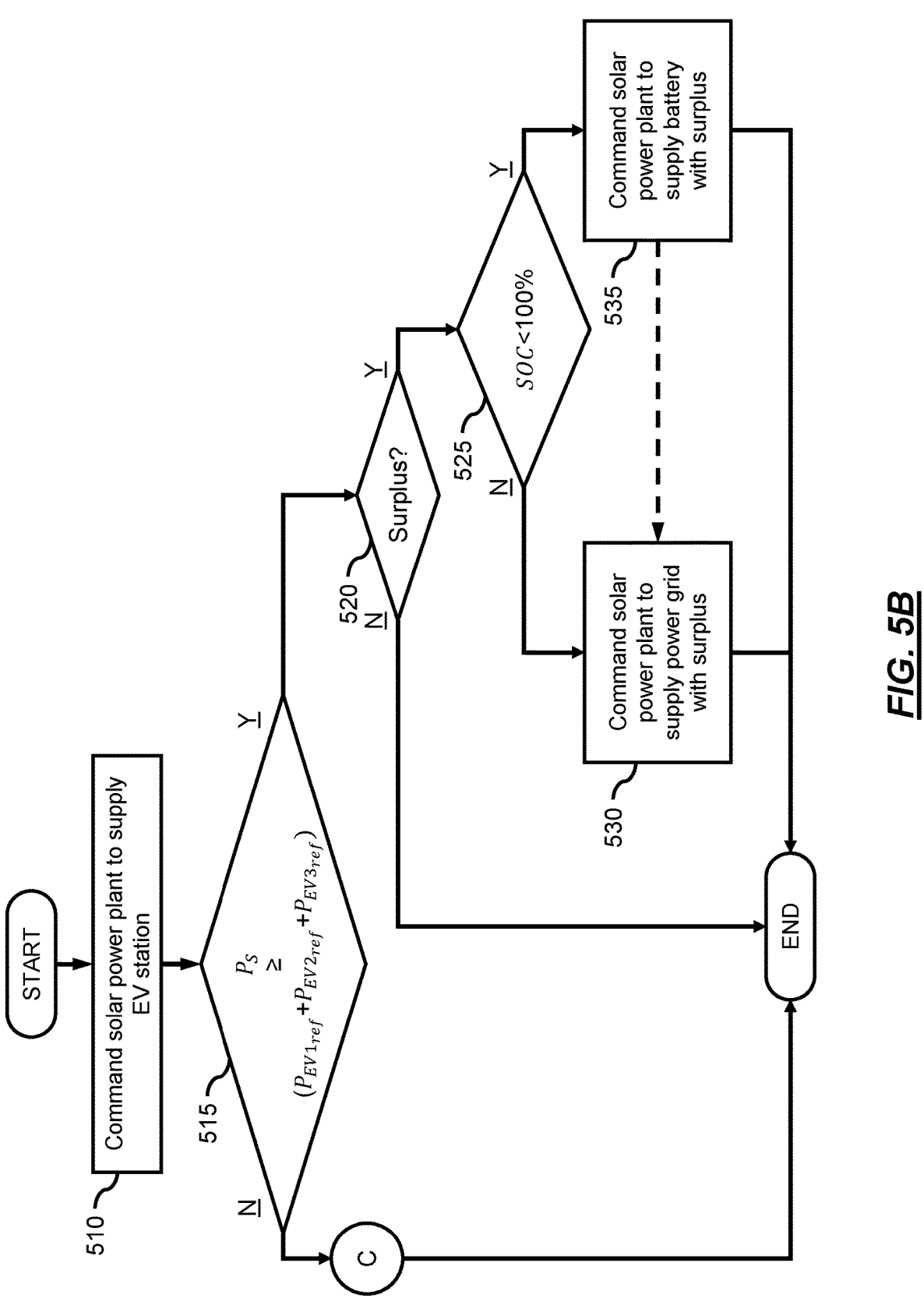
Figure 5C:
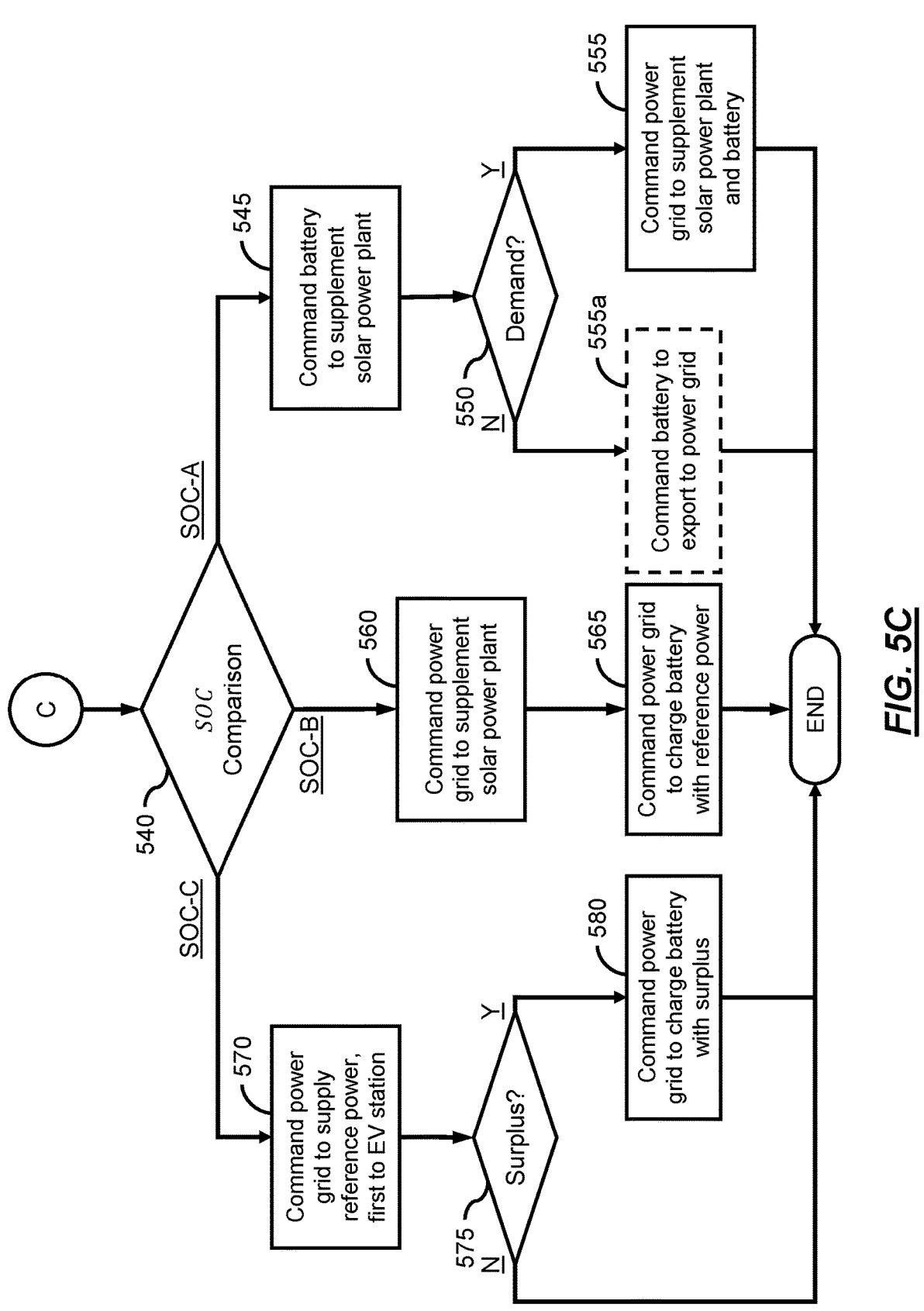

FIGS. 5A-5C show an example framework of an EMS policy in accordance with one or more embodiments. The following examples are for explanatory purposes only and not intended to limit the scope of the disclosed technology.

In one or more embodiments, the general framework of an EMS policy may be a rule-based approach that includes a set of comparisons (e.g., IF-THEN rules) to adjust the power flow between components of the VPP intelligent grid system 10. The goal of the EMS policy may be to satisfy the power request from power consumer 16 with power delivered from the power grid 12, the battery storage system 16, and the independent power plant 18. Furthermore, the EMS policy may include one or more adjustable parameters to minimize the power provided from the grid interface (e.g., improve energy independence, reduce strain on the power grid 12). Furthermore, the adjustable parameters may be tuned to limit degradation of the battery storage system 16 by regulating usage to optimal conditions (e.g., preventing large depth of discharge events, limiting maximum power output rate). While a purely rule-based approach may not guarantee simultaneous optimal performance for all components of the VPP intelligent grid system 10, appropriately defining the parameters of the EMS policy (e.g., DeltaSoc, SOCref, and Pgridref described below) may approach an optimal energy management solution that balances performance with maintaining the condition of the components of the VPP intelligent grid system 10.

FIG. 5A shows a pseudocode example, in accordance with one or more embodiment, for implementing an EMS policy in a VPP intelligent grid system 10 configured as shown in FIGS. 3A-3D (i.e., an EV charging station 16 (with three charging ports 16*a*1, 16*a*2, 16*a*3) as the power consumer 16 that is connected to a power grid 12, a battery storage system 16, and a solar power plant 18 as the independent power plant 18). The parameters of the pseudocode are defined by Table 1 below.

TABLE 1

| Parameter | Definition |
|---|---|
| Pgrid | Power imported to power grid 12 from VPP intelligent grid system 10 (negative = export to VPP) |
| Pbatt | Power imported to battery storage system 14 from VPP intelligent grid system 10 (negative = export to VPP) |
| PEV# (# = 1, 2, 3) | Power imported to a given charging port of EV charging station 16 from VPP intelligent grid system 10 (negative = export to VPP) |
| Psolar0 | Power imported to VPP intelligent grid system 10 from solar power plant 18 (min = 0, No import from VPP) |
| wrong | Error flag |
| Psolar | Power available from solar power plant 18 |
| PEV#ref | Reference power required by a given charging port of EV charging station 16 |
| SOC | State of charge of the battery storage system 14 |
| PbattMax | Maximum output power exchange rate of the battery storage system 14 |
| PgridMAX | Maximum output power exchange rate of the power grid 12 |
| Pgridref | Reference value for power provided by power grid 12 |
| SOCref | Charge reference level of battery storage system 14 |
| DeltaSoc | Range parameter for charge level of the battery storage system 14 |
| Gridswitch | Flag indicating connection/disconnection state of the power grid 12 |

The example pseudocode accepts the following parameters as inputs: Psolar, PEV1ref, PEV2ref, PEV3ref, SOC, PbattMax, PgridMAX, Pgridref, SOCref, DeltaSoc, Gridswitch, as defined in Table 1 above. The power supplied to each of the power grid 12, the battery storage system 14, and the charging ports of the EV charging station 16 are initialized to a value of zero until the appropriate determinations are made by the EMS policy. The power imported to VPP intelligent grid system 10 from solar power plant 18 is initialized to the value of the Psolar input parameter (i.e., all power produced by the solar power plant 18 is imported to the VPP intelligent grid system 10). Subsequent to the initialization, the parameter Psolar is recalibrated (e.g., offset) based on the total reference power required by all charging ports of EV charging station 16.

The primary section of the example pseudocode is based on the recalibrated parameter Psolar.

If the recalibrated parameter Psolar is equal to zero (i.e., the total reference power required by all charging ports of EV charging station 16 is equal to the power produced by the solar power plant 18), each of the charging ports of the EV charging station 16 is instructed to import the respective reference power from the VPP intelligent grid system 10. In other words, the solar power plant 18 is instructed to provide all of the power to the EV charging station 16 and the power grid 12 and the battery storage system 14 are not utilized (e.g., no instructions to import power to the VPP intelligent grid system 10, instructions to disconnect/standby).

If recalibrated parameter Psolar is greater than zero (i.e., the power produced by the solar power plant 18 exceeds the total reference power required by all charging ports of EV charging station 16), further determinations must be made by the EMS policy to distribute the surplus power after the solar power plant 18 is instructed to provide all of the power to the EV charging station 16. This process is described in further detail below with reference to FIG. 5B.

If recalibrated parameter Psolar is less than zero (i.e., the power produced by the solar power plant 18 is insufficient to supply the total reference power required by all charging ports of EV charging station 16), further determinations must be made by the EMS policy to import power from at least one of the power grid 12 and the battery storage system 14 to provide sufficient power to the EV charging station 16. This process is described in further detail below with reference to FIG. 5C.

A secondary section of the example pseudocode is based on a connection state of the power grid 12.

If the power grid 12 is not connected to the VPP intelligent grid system 10 (i.e., gridswitch=0), the previous policy is neglected by allocating the power available from the battery storage system 14 and the solar power plant 18 proportionally with the power request of each charging port of the EV charging station 16. For example, a broken power line, an AC power grid failure, or a manual disconnection causes the VPP intelligent grid system 10 to operate in stand-alone mode.

If the power grid 12 is connected to the VPP intelligent grid system 10 (i.e., gridswitch=1), each of the charging ports of the EV charging station 16 is instructed to import the respective reference power from the VPP intelligent grid system 10.

The tertiary section of the example pseudocode evaluates if the power allocation correctly distributes the amount of power and satisfies the maximum available power limit. If unsuccessful, a 'wrong' flag is set to one, and the operation may be stopped (e.g., restart, recalibrate input values, alert user to error, run diagnosis).

FIG. 5B shows a flowchart of a method for handling a situation in which the power produced by an independent power plant 18 (e.g., the solar power plant 18) exceeds the power demand of a power consumer 16 (e.g., the EV charging station 16).

At 510, the processor 110 sends a command to the independent power plant 18 to provide power to the power consumer. Because the power of the independent power plant 18 is sufficient to satisfy the power consumer 16, any remaining power capacity of the independent power plant 18 must be is instructed to provide all of the power to the EV charging station 16. The method then proceeds to 515.

At 515, the processor 110 determines whether or not the power produced by the independent power plant 18 (e.g., original value for Psolar, all power produced by the solar power plant 18 is imported to the VPP intelligent grid system 10) is greater than or equal to the power required by the power consumer 16 (e.g., the sum of the total reference power required by each charging port of EV charging station 16 (PEV1ref+PEV2ref+PEV3ref)).

When the determination at 515 is NO, the method proceeds to the flowchart in FIG. 5C.

When the determination at 515 is YES, the method proceeds to 520.

At 520, the processor 110 determines whether or not there is a surplus of power from the independent power plant 18 after satisfying the power demand of the power consumer 16.

When the determination at 520 is NO (i.e., the power of the independent power plant 18 is equal to the power demand of the power consumer 16), the method ends. In other words, no further determinations by the EMS policy may be necessary after the total power of the independent power plant 18 has been allocated in the VPP intelligent grid system 10.

When the determination at 520 is YES, the method proceeds to 525.

At 525, the processor 110 determines whether or not the state of charge (SOC) of the battery storage system 14 is less than 100% (i.e., not completely charged). For example, the VPP controller 100 may query the battery storage system 14 via the battery storage interface 114 to determine the current SOC parameter.

When the determination at 525 is NO (i.e., the battery storage system 14 is fully charged), the method proceeds to 530.

At 530, the processor 110 sends a command to the independent power plant 18 to supply the power grid 12 with the surplus power from the independent power plant 18. In other words, the independent power plant 18 exports energy to the power grid 12 after satisfying the power demand of the power consumer 16. In one or more embodiments, at 555*a*, the processor 110 determines whether or not to export power to the power grid 12 based on power grid information (e.g., a reference power level, connection type/status information, price information) received by the power grid interface 112. Then the method ends.

When the determination at 525 is YES (i.e., the battery storage system 14 is not fully charged), the method proceeds to 535.

At 535, the processor 110 sends a command to the independent power plant 18 to supply the battery storage system 14 with the surplus power from the independent power plant 18. In other words, the independent power plant 18 uses the surplus power capacity to charge the battery storage system 14. Then the method ends.

In one or more embodiments, the processor 110 may additionally send a command to the independent power plant 18 to supply the power grid 12 with a portion of the surplus power from the independent power plant 18 (i.e., the method proceeds to 530 before ending). For example, when the power output rate of the independent power plant 18 exceeds the power input rate of the battery storage system 14, a portion of the power output by the independent power plant 18 may be exported to the power grid 12.

FIG. 5C shows a flowchart of a method for handling a situation in which the power produced by an independent power plant 18 (e.g., the solar power plant 18) is insufficient to satisfy the power demand of a power consumer 16 (e.g., the EV charging station 16).

At 540, the processor 110 compares the SOC of the battery storage system 14 to a plurality of ranges. In one or more embodiments, the plurality of ranges include: SOC-A, where the SOC of the battery storage system 14 is greater than or equal to (SOCref+ΔSOC) (ΔSOC corresponds to DeltaSoc in FIG. 5A); SOC-B, where the SOC of the battery storage system 14 is less than or equal to (SOCref−ΔSOC);

and SOC-C, where the SOC of the battery storage system 14 is less than (SOCref+ΔSOC) and greater than (SOCref–ΔSOC). The parameter SOCref is a charge reference level of the battery storage system 14. The parameter ΔSOC is a range parameter. Adding the range parameter ΔSOC to the reference level SOCref or subtracting the range parameter ΔSOC from the reference level SOCref creates a complete set of ranges: a central range SOC-C, a lower range SOC-B, and an upper range SOC-A. In one or more embodiments, the plurality of ranges of the EMS policy may be defined specific boundary values rather than a reference level and a range parameter.

As discussed in further detail below with respect to FIG. 6, the value of SOCref and ΔSOC may be determined by a ML model 600 trained with historical data of the VPP intelligent grid system 10. In other embodiments, the plurality of ranges may be based on one or more additional parameters (e.g., Pgridref, another parameter of the VPP intelligent grid system 10, another parameter determined by the trained ML model 600).

When the comparison at 540 yields SOC-A, the method proceeds to 545.

At 545, the processor 110 sends a command to the battery storage system 14 to provide power to the power consumer 16 and supplement the power supplied by the independent power plant 18 at 510. In other words, because the power of the independent power plant 18 is insufficient to satisfy the power consumer 16 alone at 510, the battery storage system 14 is utilized to cover the shortfall when the SOC of the battery storage system 14 falls in the upper range SOC-A. The method then proceeds to 550.

Because the SOC of the battery storages system 14 is greater than or equal to (SOCref+ΔSOC), it may be advantageous to utilize the stored battery energy. In other words, the SOC-A range of the EMS policy keeps the battery storage system 14 from sitting idle at a high SOC, where leakage and discharge efficiency rates age the battery cells 14*a-c* more rapidly.

At 550, the processor 110 determines whether or not the power consumer 16 has additional power demand that has not been met by the combined power supplied from the independent power plant 18 and the battery storage system 14 at 545.

When the determination at 550 is NO (i.e., the power demand has been satisfied by the independent power plant 18 and the battery storage system 14), the method may proceed to 555*a* or may end.

At 555*a*, the processor 110 optionally sends a command to the battery storage system 14 to supply power to the power grid 12. For example, when the battery storage system 14 has additional capacity after satisfying the power demand of the power consumer 16 at 545, the additional capacity may be exported (e.g., sold) to the power grid 12. In one or more embodiments, at 555*a*, the processor 110 determines whether or not to export power to the power grid 12 based on power grid information (e.g., a reference power level, connection type/status information, price information) received by the power grid interface 112.

When the determination at 550 is YES (i.e., the power demand has not been satisfied by the independent power plant 18 and the battery storage system 14), the power demand, the method proceeds to 555. For example, during periods of high demand, the maximum power output rating of the battery storage system 14 may be insufficient to cover the shortfall of the independent power plant 18, resulting in additional demand from the power consumer 16.

At 555, the processor 110 sends a command to the power grid 12 to provide power to the power consumer 16 and supplement the combined power supplied by the independent power plant 18 and the battery storage system 14 at 545. In other words, because the power of the independent power plant 18 and the battery storage system 14 are insufficient to satisfy the power consumer 16, the power grid 12 is utilized to cover the shortfall. Because the power grid 12 functionally has an infinite power capacity to draw upon, any remaining shortfall in the power demand of the power consumer 16 is fully satisfied at 555. Then the method ends.

When the comparison at 540 yields SOC-B, the method proceeds to 560.

At 560, the processor 110 sends a command to the power grid 12 to provide power to the power consumer 16 and supplement the power supplied by the independent power plant 18 at 510. In other words, because the power of the independent power plant 18 is insufficient to satisfy the power consumer 16 alone at 510, the power grid 12 is utilized to cover the shortfall. Because the power grid 12 functionally has an infinite power capacity to draw upon, any remaining shortfall in the power demand of the power consumer 16 is fully satisfied at 560. The method then proceeds to 565.

At 565, the processor 110 sends a command to the power grid 12 to provide power to (i.e., charge) the battery storage system 14. In one or more embodiments, the power grid 12 may provide an entirety of reference power allocation (e.g., Pgridref) to charge the battery storage system 14. Because the power grid 12 functionally has an infinite power capacity to draw upon, after satisfying the power demand of the power consumer 16 at 560, the power grid 12 can additionally provide power to charge the battery cells 14*a*1-3 of the battery storage system 14 without compromising service to the power consumer 16. Then the method ends.

Because the SOC of the battery storages system 14 is less than or equal to (SOCref–ΔSOC), it may be advantageous to charge the battery storage system 14. In other words, the SOC-B range of the EMS policy keeps the battery storage system 14 from sitting idle at a low SOC, where the battery storage system 14 has too little charge to support the operations of the VPP intelligent grid system 10. Because the entirety of the reference power allocation is provided to the battery storage system 14, the SOC of the battery storage system 14 can be quickly raised to support future operations of the VPP intelligent grid system 10. In one or more embodiments, the processor 110 determines the reference power allocation based on the ML model and/or power grid information (e.g., a reference power level, connection type/status information, price information) received by the power grid interface 112.

In one or more embodiments, the reference power allocation may be selected to ensure efficient charging of the battery storage system 14 at 565. As discussed in further detail below with reference to FIG. 6, an ML model may be configured to set the reference power allocation as one of the parameters of the EMS policy. For example, the ML model may be trained with historical time-series data of SOC of the battery storage system 14 such that the ML model can set the reference power allocation at an appropriate level to optimize performance of the battery storage system 14 (e.g., level that minimizes aging of the battery cells 14*a*1-3, level that minimizes time to achieve a predetermined SOC level).

When the comparison at 540 yields SOC-C, the method proceeds to 570.

At 570, the processor 110 sends a command to the power grid 12 to provide a reference power allocation (e.g., Pgridref) to both of the power consumer 16 (i.e., to supplement the power supplied by the independent power plant 18 at 510) and to the battery storage system 14 (i.e., to charge the battery cells 14a1-3). Because the power of the independent power plant 18 is insufficient to satisfy the power consumer 16 alone at 510, a first portion of the reference power allocation from the power grid 12 provides the additional power necessary to satisfy the power demand of the power consumer 16. The method then proceeds to 565.

In one or more embodiments, the reference power allocation may be selected to ensure that any shortfall in the power demand of the power consumer 16 is fully satisfied at 570. As discussed in further detail below with reference to FIG. 6, an ML model may be configured to set the reference power allocation as one of the parameters of the EMS policy. For example, the ML model may be trained with historical time-series data of power usage of the power consumer 16 such that the ML model can reliably set the reference power allocation at a high enough level to prevent disruption in service to the power consumer 16.

At 575, the processor 110 determines whether or not the reference power allocation includes any surplus amount of power after satisfying the power demand of the power consumer 16.

When the determination at 575 is NO (i.e., the reference power allocation exactly satisfies the shortfall), the method ends. In other words, the first portion of the reference power allocation includes the entirety of the reference power allocation and a second portion of the reference power allocation is zero. Therefore, no additional power is available from the power grid 12 to charge the battery storage system 14.

When the determination at 575 is YES (i.e., the reference power allocation exceeds the shortfall), the method proceeds to 580. In other words, the first portion of the reference power allocation does not include the entirety of the reference power allocation and the remainder constitutes a second portion of the reference power allocation. Therefore, the second portion of the reference power allocation is non-zero and additional power is available from the power grid 12 to charge the battery storage system 14.

At 580, the processor 110 sends a command to the power grid 12 to provide power to (i.e., charge) the battery storage system 14. Because a first portion of the reference power allocation provides the necessary power to satisfy the power demand of the power consumer 16, the remainder of the reference power allocation (i.e., the second portion of the reference power allocation) is provided to the battery storage system 14, without compromising service to the power consumer 16. Then the method ends.

Because the SOC of the battery storages system 14 is less than (SOCref+ΔSOC) and greater than (SOCref−ΔSOC), it may be advantageous to moderate utilization of the power grid 12. In other words, the SOC-C range of the EMS policy reduces usage and dependence on the power grid 12 (e.g., limiting charging of the battery storage system 14 when the battery storage system 14 has adequate charge to support the operations of the VPP intelligent grid system 10). Therefore, while the SOC of the battery storage system 14 is within the range parameter ΔSOC of the charge reference level SOCref, the battery storage system 14 can be charged at a slower rate relative to using an entirety of the reference power allocation (e.g., EMS policy for SOC-B at 565).

While the various steps in FIGS. 5A-5C are presented and described sequentially, one of ordinary skill in the art will appreciate that some or all of the steps may be executed in different orders (e.g., in parallel or reordered), repeated, combined, and/or omitted. For example, the processor 110 of the VPP controller 100 may be configured to transmit a series of individual instructions as sequential commands (e.g., separate transmissions at 510, 545, 555) or compile the individual instructions into a single command transmission (e.g., a single transmission at 555 that includes all commands from 510, 545, 555). In one or more embodiments, a command transmitted by the VPP controller 100 may include multiple commands (e.g., instructions, queries) that are sent to more than one component of the VPP intelligent grid system 10. Accordingly, the scope of the invention should not be limited by the specific arrangement as depicted in FIGS. 5A-5C.

Although FIGS. 5A-5C relate to a series of IF-THEN rules forming the framework of the EMS policy, it will be appreciated that an EMS policy according to one or more embodiments, may include more, fewer, or different comparisons. For example, while the above embodiments have been described with respect to a primary comparison based on the output power of a solar power plant 18 (e.g., Psolar==0, Psolar>0, Psolar<0), the present invention is not limited to this configuration and the independent power plant 18 may be any type of suitable power generation facility (e.g., wind power plant, hydropower plant, geothermal power plant).

Furthermore, the EMS policy may include more, fewer, or different comparisons (e.g., pricing comparisons with power from the power grid 12, equipment health monitoring comparisons to disable/disconnect portions of the VPP intelligent grid system 10, comparing power output/capacity/usage of multiple independent power plant 18) and input parameters (e.g., connection status of different VPP components, user preferences for power source, user preference for optimization of specific VPP components). The present invention is not limited to the particular configurations described herein.

The methods of FIGS. 5A-5C may be implemented using instructions stored on a non-transitory medium that may be executed by a computer processor (e.g., a VPP controller 100 as discussed above with respect to FIGS. 1A-1B).

Furthermore, the EMS policy may include one or more adjustable parameters to minimize the power provided from the grid interface (e.g., improve energy independence, reduce strain on the power grid 12). Furthermore, the adjustable parameters may be iteratively reevaluated based on the usage and current conditions in the VPP intelligent grid system 10. In other words, the parameters of the EMS policy may be constantly evaluated and tuned to limit degradation of the battery storage system 14 by regulating usage to optimal conditions (e.g., preventing large depth of discharge events, limiting maximum power output rate, maintaining SOC within an optimal range). Using the non-limiting example EMS policy framework shown in FIGS. 5A-5C, certain parameters of the EMS policy may be tuned to optimize the usage of battery storage system 16 (e.g., the SOCref parameter, the DeltaSoc (ΔSOC) parameter, the Pgridref parameter).

While a purely rule-based approach may not guarantee simultaneous optimal performance for all components of the VPP intelligent grid system 10, appropriately defining the parameters of the EMS policy may approach an optimal energy management solution that balances performance with maintaining the condition of the components of the VPP intelligent grid system 10. As described below with respect to FIG. 6, machine learning algorithms may be leveraged to achieve this objective.

Figure 6:
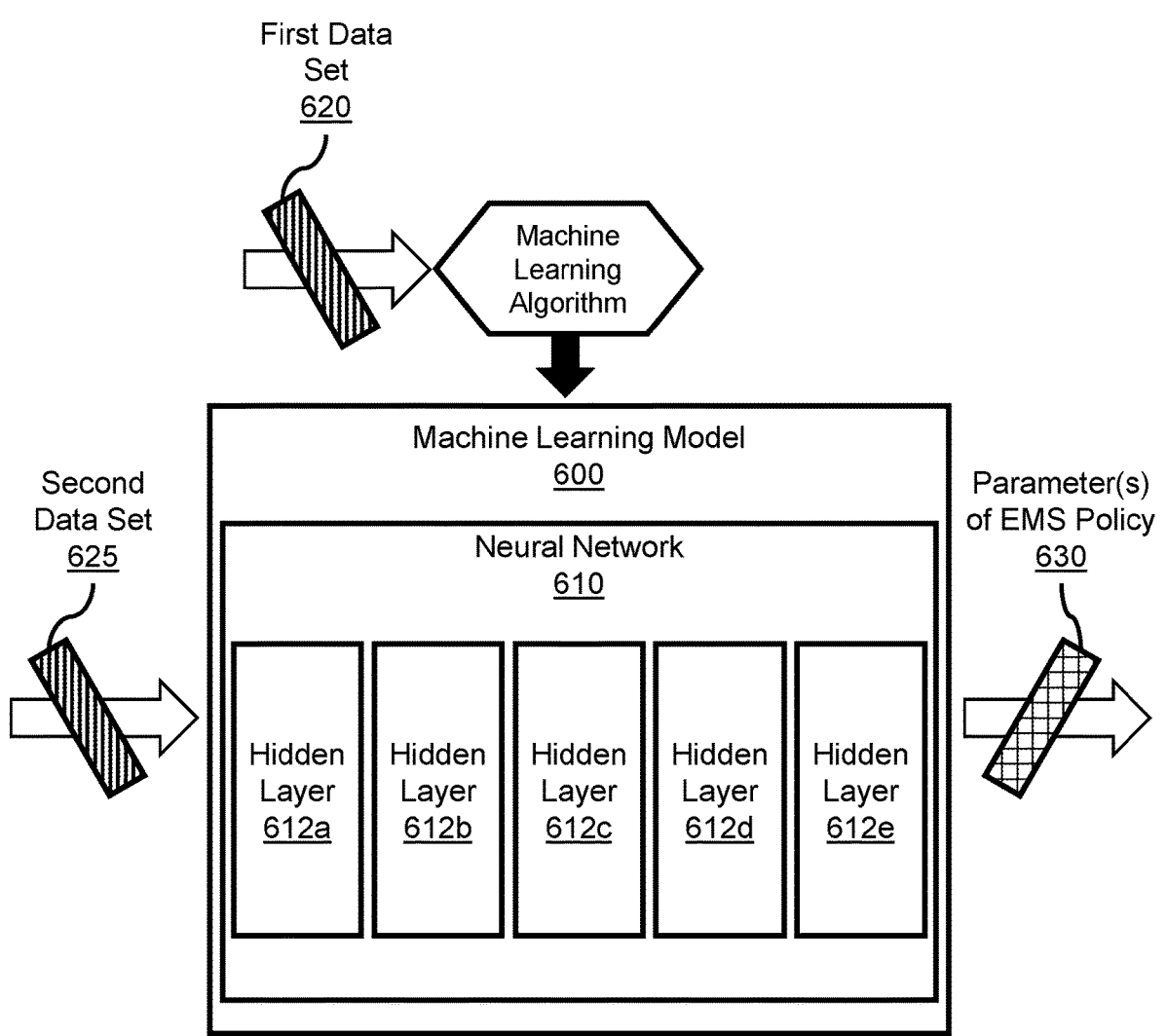
FIG. 6 shows an implementation example of a machine learning (ML) model in accordance with one or more embodiments.

FIG. 6 shows an implementation example of a machine learning (ML) model in accordance with one or more embodiments. Generally, the ML model 600 is trained to determine parameters of the EMS policy to satisfy a power demand of the power consumer 16 over a predetermined horizon while maximizing lifetime performance of a battery storage system 14. For example, one or more ML algorithms use a first data set 620 (e.g., time-series information from components of the VPP intelligent grid system 10) to train ML model 600 to accept a second data set 625 (e.g., power availability information from components of the VPP intelligent grid system 10) and output one or more parameters of the EMS policy 630.

For example, in one or more embodiments utilizing an EMS policy in accordance with FIGS. 5A-5C, the ML model 600 may determine a charge reference level and a range parameter (or alternatively, upper and lower bounds) that define an optimal range of the SOC of the battery storage system 14. Using the SOC range determined by the ML model 600 to control how power is distributed within the VPP intelligent grid system 10 can minimize degradation of the battery storage system 14 while still aiding in satisfying the power demand of power consumer 16.

Alternatively, or in addition to the above example, the ML model 600 may determine other parameters of the EMS policy. For example, determining a reference power allocation from the power grid 12 (e.g., the amount of power used to charge the battery storage system 14) also influences how power is distributed within the VPP intelligent grid system 10 and indirectly affects the usage and degradation of the battery storage system 14.

In one or more embodiments, the ML model 600 includes a deep learning neural network 610. The neural network 610 may include one or more hidden layers 612a-e (e.g., convolutional, pooling, filtering, down-sampling, up-sampling, layering, regression, dropout), where each hidden layer includes one or more modelling nodes (i.e., neurons). In some embodiments, the number of hidden layers may be greater than or less than the five layers shown in FIG. 6. The hidden layers 612a-e can be arranged in any order.

Each hidden layer 612 includes one or more modelling neurons. The neurons are modelling nodes or objects that are interconnected to emulate the connection patterns of the human brain. Each neuron may combine data inputs with a set of network weights and biases for adjusting the data inputs. The network weights may amplify or reduce the value of a particular data input to alter the significance of each of the various data inputs for a task that is being modeled. For example, adding a constant to a particular data input shifts the activation function for an associated task being modeled. The activation function in turn determines whether and to what extent an output of one neuron affects other neurons (e.g., one neuron output may be a weight value for use as an input to another neuron or hidden layer). Through machine learning (i.e., training at block 420 of FIG. 4), the neural network 610 may determine which data inputs should receive greater priority in determining one or more specified outputs of the neural network 610.

For example, in one or more embodiments in accordance with the method of FIG. 4 described above, one or more semi-supervised, unsupervised (e.g., such one short learning), and/or reinforcement based (e.g., feedback based on simulated performance metrics of the VPP intelligent grid system 10) machine learning algorithms train the hidden layers 612 of the neural network 610 using a first data set 620 (i.e., data obtained at block 410 of FIG. 4). The first data set 620 may include labeled or unlabeled time-series information from components of the VPP intelligent grid system 10 (e.g., information obtained from each of the power grid 12, the battery storage system 14, the power consumer 16, and the power plant 18). In one or more embodiments, the first data set 620 may be labelled according to power usage of the power consumer 16, power output of the independent power plant 18, power output capacity of the power grid 12, and SOC of the battery storage system 14. In one or more embodiments with an EV charging station 16 as the power consumer 16, time-series information used to train the ML model 600 is based on a maximum charge rate of the EV charging station 16. In some embodiments, real, synthetic, and/or augmented (e.g., curated, or supplemented data) data from one or more components of the VPP intelligent grid system 10 may be combined to produce a large amount of interpreted data as the first data set 620.

The trained ML model 600 accepts a second data set 625 (i.e., data obtained at block 430 of FIG. 4) as an input to determine one or more parameters of the EMS policy 630. The second data set may include power availability information from each of the battery storage system 14, the power grid 12, and the independent power plant 18. In other words, the pre-learned (i.e., trained) filters of the hidden layers 612 convolve the power availability information in the second data set 625 to determine one or more parameters of the EMS policy 630 (i.e., block 440 of FIG. 4). In one or more embodiments, ΔSOC is a range parameter determined by the ML model 600. In one or more embodiments, a charge reference level, SOCref, is determined by the ML model 600. In one or more embodiments, a reference power allocation parameter, Pgridref, is determined by the ML model 600. In one or more embodiments with an EV charging station 16 as the power consumer 16, reference power allocation determined by the ML model 600 is based on a maximum charge rate of the EV charging station 16.

The output of the ML model 600 (i.e., the parameter(s) of the EMS policy 630) are used to modify the EMS policy of the VPP intelligent grid system 10. For example, one or more parameters of the EMS policy may be implemented over a predetermined horizon before being revaluated and/or updated by the ML model 600. Based on the updated EMS policy, the VPP controller 100 generates and transmits a command to control an amount of power supplied to the power consumer 16 from at least one of the power grid 12, the battery storage system 14, and the independent power plant 18.

While FIG. 6 shows an example configuration, other model configurations may be used without departing from the scope of the disclosure. For example, in the ML model 600, a different type of model (e.g., deep learning model, categorization model) may be used in addition to or instead of the neural network 610 shown in FIG. 6. Accordingly, the scope of the invention should not be limited by the specific ML model 600 depicted in FIG. 6.

To achieve its designed objective, the ML model 600 may include several simulation models related to the individual components of the VPP intelligent grid system 10.

In one or more embodiments, the ML model 600 includes a simulation model of the power grid 12. The simulation model considers inputs such as power flow command signals (e.g., defined by a user or the energy management policy of the VPP controller 100) and outputs the instantaneous price of the electrical energy ($/kW·hr) and the reference constant power value to be provided by the power grid 12. Other parameters characterizing the power grid simulation model may include the reference value of electric energy from one or more providers, the maximum absolute value of the power capacity, the reference value of the power to be delivered by the power grid, a flag for activating/deactivating the power grid connection to the VPP intelligent grid system 10, and the electric energy price dynamics (e.g., expected price models based on different economic trajectories such as a constant value, a sinusoidal value, and a random value centered on the reference energy cost).

In one or more embodiments, the ML model 600 includes a simulation model of the battery storage system 14. The simulation model considers inputs such as power flow command signals (e.g., defined by a user or the energy management policy of the VPP controller 100) and outputs the battery state of charge (SOC), a reference SOC (e.g., a threshold level for determining new control behavior), and the instantaneous value of the battery power. Other parameters characterizing the power grid simulation model may include the battery SOC value at the beginning of the simulation, the reference SOC, the battery power converter efficiency, the battery capacity, a switch permitting to activate/deactivate the battery connected to the VPP intelligent grid system 10, and a flag/status for defining the battery thermal dynamics (temperature effects in simulating the performance of the battery 14a and battery cells 14al can be considered or ignored based on the flag).

Furthermore, battery simulation models representing lithium-ion, lithium-polymer, or lead-acid batteries can be parameterized by using manufacturer data to approximate the open-circuit voltage and the internal resistance characteristics related to battery state of charge and temperature. For example, a leakage model may be employed based on the chemical property of the batteries to characterize the amount of self-discharge. Consider the battery open circuit $E_m$ and the internal resistance $R_{int}$, the battery dynamics may be described by Equation (0) (positive current indicates battery discharge):

$$V_T = E_m + I_{batt}R_{int}; \qquad (0)$$

$$I_{batt} = \frac{I_{in}}{N_p};$$

$$V_{out} = N_S V_T;$$

$$SOC = \frac{1}{Cap_{batt}} \int I_{batt}\,dt;$$

$$Ld_{AmpHr} = \int I_{batt}\,dt$$

where $I_{batt}$ is the battery current, $Ld_{AmpHr}$ is the battery energy, $Cap_{batt}$ is the battery capacity, Vout is the battery voltage, Np and Ns are the number of cells in parallel and series, respectively, $I_{in}$ is the current flowing from the battery network, and SOC is the battery state of charge. In one or more embodiments, this simulation model may be extended to include thermal dynamic effects and/or aging effects.

In one or more embodiments, the battery storage system 14 would be modelled as a set of cells, single batteries, and/or long strings of high-capacity batteries operating as a power storage unit. This battery model is controlled by the VPP controller 100, which regulates the power flow between cells, charging and discharging phases, and other aspects related to battery management services according to battery specifications and operating conditions. The simulation model may include additional features, such as full power battery equalization capability, battery cell disconnection capability, thermal management, protection, and fault tolerance methods or maximization of the delivered battery energy, heuristic methods (deterministic rule-based strategies), optimization methods (based on robust optimal or predictive control methods).

In one or more embodiments, the ML model 600 includes a simulation model of the power consumer 16. For example, in one or more embodiments including an EV charging station 16, the simulation model considers inputs such as power flow command signals (e.g., defined by a user or the energy management policy of the VPP controller 100) and outputs the EV battery state of charge (SOC), a reference EV SOC (e.g., a threshold level for determining new control behavior), and a map of the power to be provided from/to the EV for charging/discharging operations. Other parameters characterizing the power grid simulation model may include the EV battery SOC value at the beginning of the simulation, the reference EV SOC, the EV battery power converter efficiency, the EV battery capacity, a switch permitting to activate/deactivate the connection between the EV and the VPP intelligent grid system 10, and a flag/status for defining the battery thermal dynamics (temperature effects in simulating the performance of the EV battery).

This simulation model may be designed to maximize the EV battery life while minimizing energy cost and charging time for the owner of the EV. The simulation model may be expanded to provide an optional online charge trade application that manages charge offering/reserve/purchase to reflect the capabilities that allow EVs to share their battery with the intelligent grid system. Therefore, the EV may be modeled as an expansion of the overall power capacity of EV charging station 16 (or the VPP intelligent grid system 10 as a whole). The simulation model further predicts the financial benefit to the owner of the EV that participates in such a power-to-grid service and moderates the service to ensure the EV is charged for use by the owner based on the owner's usage or preference information.

In one or more embodiments, the ML model 600 includes a simulation model of the independent power plant 18 (e.g., a solar power plant 18). The simulation model considers inputs such as power flow command signals (e.g., defined by a user or the energy management policy of the VPP controller 100) and outputs a reference power level value to be provided by the independent power plant 18. Other parameters characterizing the independent power plant simulation model may include the maximum absolute value of the power production capacity, the reference value of the power to be delivered by the independent power plant, a flag for activating/deactivating the independent power plant connection to the VPP intelligent grid system 10, and weather information (or relevant forecasts related to the method of energy production).

In one or more embodiments including a solar power plant 18, this simulation model may mimic the series and parallel connection of several solar panels composed of photovoltaic (PV) devices (solar cells). Because the solar cells convert solar energy into electrical energy via the photovoltaic effect (generally by utilizing large-area p-n diodes that are assembled in modules (panels)), a single solar cell may be modeled as a resistor connected in series with a parallel combination of a current source consisting of a single diode with a shunt resistance structure RSH. The simulation model simulates the photoelectric effect that converts solar energy directly into electric energy and simulates the electrical characteristics (current, voltage, and resistance) that vary based on the amount of light upon the solar cell.

Embodiments of the invention may have one or more of the following improvements to intelligent grid functionality or power management systems: manage communications between power subsystems; handle communication with external components and services (online charge trader, online weather data); control virtual power plant components (control the power flow with the AC grid, manage battery storage system power flow, manage the power dispatch scheme between virtual power plant components, evaluate battery stored energy, capacity fade (battery wearing), estimated time to service (replace batteries), adapt to customers and components power requirements); provide control system to adapt and optimize power flow allocation, optimizing battery charging sequences, providing emergency energy capacity, managing energy excess, implementing physical/logical limits on the power grid operations as defined by the operator; or any combination of these aspects.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of operating a virtual power plant (VPP) controller that manages a power consumer connected to a power grid, a battery storage system, and an independent power plant, the method comprising:

obtaining a first data set including time-series information for each of:

power usage of the power consumer;

power output of the independent power plant;

power output capacity of the power grid; and state of charge (SOC) of the battery storage system;

training a machine learning (ML) model based on the time-series information using a ML algorithm, wherein the ML model determines one or more parameters of an energy management system (EMS) policy to satisfy a power demand of the power consumer over a predetermined horizon;

obtaining a second data set including power availability information from each of the battery storage system, the power grid, and the independent power plant;

determining, by inputting the second data set into the ML model, the one or more parameters of the EMS policy to satisfy the power demand of the power consumer;

transmitting a command, based on the EMS policy, to at least one of the power grid, the battery storage system, and the independent power plant to control an amount of power supplied to the power consumer, wherein the EMS policy includes a comparison of the SOC of the battery storage system to the following ranges:

$$SOC \geq SOC_{ref} + \Delta SOC, \quad \text{SOC-A:}$$

$$SOC \leq SOC_{ref} - \Delta SOC, \quad \text{SOC-B:}$$

$$SOC_{ref} - \Delta SOC < SOC < SOC_{ref} + \Delta SOC, \quad \text{SOC-C:}$$

wherein $SOC_{ref}$ is a charge reference level of the battery storage system, and wherein $\Delta SOC$ is a range parameter that is one of the one or more parameters determined by the ML model, and wherein the EMS policy includes different commands based on the SOC satisfying one of the ranges SOC-A, SOC-B, and SOC-C.

2. The method of claim 1, wherein the charge reference level, $SOC_{ref}$, is one of the one or more parameters determined by the ML model.

3. The method of claim 1, wherein the command includes instructions for the independent power plant to provide power to the power consumer, and when the SOC satisfies the range SOC-A, the command includes additional instructions for the battery storage system to provide additional power to satisfy the power demand of the power consumer, when the SOC satisfies the range SOC-B, the command includes additional instructions for:

the power grid to provide additional power to satisfy the power demand of the power consumer; and the power grid to provide power to charge the battery storage system with an entirety of a reference power allocation, when the SOC satisfies the range SOC-C, the command includes additional instructions for the power grid to split the reference power allocation between the power consumer and the battery storage system, wherein a first portion of the reference power allocation provides additional power to satisfy the power demand of the power consumer, and a second portion of the reference power allocation provides power to charge the battery storage system.

4. The method of claim 3, wherein when the SOC satisfies the range SOC-A, the command includes additional instructions for the power grid to provide additional power to satisfy the power demand of the power consumer.

5. The method of claim 3, wherein when the SOC satisfies the range SOC-A, the command includes additional instructions for the battery storage system to export energy to the power grid after satisfying the power demand of the power consumer.

6. The method of claim 3, wherein the power consumer is an electric vehicle (EV) charging station, the time-series information used to train the ML model is based on a maximum charge rate of the EV charging station, and the reference power allocation is based on the maximum charge rate of the EV charging station.

7. A non-transitory computer readable medium storing instructions executable by a computer processor of a virtual power plant (VPP) controller that manages a power consumer connected to a power grid, a battery storage system, and an independent power plant, the instructions comprising functionality for:

obtaining a first data set including time-series information for each of:

power usage of the power consumer;

power output of the independent power plant;

power output capacity of the power grid; and state of charge (SOC) of the battery storage system;

training a machine learning (ML) model based on the time-series information using a ML algorithm, wherein the ML model determines one or more parameters of an energy management system (EMS) policy to satisfy a power demand of the power consumer over a predetermined horizon;

obtaining a second data set including power availability information from each of the battery storage system, the power grid, and the independent power plant;

determining, by inputting the second data set into the ML model, the one or more parameters of the EMS policy to satisfy the power demand of the power consumer;

transmitting a command, based on the EMS policy, to at least one of the power grid, the battery storage system, and the independent power plant to control an amount of power supplied to the power consumer, wherein the EMS policy includes a comparison of the SOC of the battery storage system to the following ranges:

$$SOC \geq SOCref + \Delta SOC, \qquad \text{SOC-A:}$$

$$SOC \leq SOCref - \Delta SOC, \qquad \text{SOC-B:}$$

$$SOCref - \Delta SOC < SOC < SOCref + \Delta SOC, \qquad \text{SOC-C:}$$

wherein SOCref is a charge reference level of the battery storage system, and wherein $\Delta SOC$ is a range parameter that is one of the one or more parameters determined by the ML model, and wherein the EMS policy includes different commands based on the SOC satisfying one of the ranges SOC-A, SOC-B, and SOC-C.

8. The non-transitory computer readable medium of claim 7, wherein the charge reference level, SOCref, is one of the one or more parameters determined by the ML model.

9. The non-transitory computer readable medium of claim 7, wherein the command includes instructions for the independent power plant to provide power to the power consumer, and when the SOC satisfies the range SOC-A, the command includes additional instructions for the battery storage system to provide additional power to satisfy the power demand of the power consumer, when the SOC satisfies the range SOC-B, the command includes additional instructions for:

the power grid to provide additional power to satisfy the power demand of the power consumer; and the power grid to provide power to charge the battery storage system with an entirety of a reference power allocation, when the SOC satisfies the range SOC-C, the command includes additional instructions for the power grid to split the reference power allocation between the power consumer and the battery storage system, wherein a first portion of the reference power allocation provides additional power to satisfy the power demand of the power consumer, and a second portion of the reference power allocation provides power to charge the battery storage system.

10. The non-transitory computer readable medium of claim 9, wherein when the SOC satisfies the range SOC-A, the command includes additional instructions for the power grid to provide additional power to satisfy the power demand of the power consumer.

11. The non-transitory computer readable medium of claim 9, wherein when the SOC satisfies the range SOC-A, the command includes additional instructions for the battery storage system to export energy to the power grid after satisfying the power demand of the power consumer.

12. The non-transitory computer readable medium of claim 9, wherein the power consumer is an electric vehicle (EV) charging station, the time-series information used to train the ML model is based on a maximum charge rate of the EV charging station, and the reference power allocation is based on the maximum charge rate of the EV charging station.

13. A virtual power plant (VPP) controller that manages a power consumer connected to a power grid, a battery storage system, and an independent power plant, the VPP controller comprising:

a processor configured as:

a power grid interface that communicates with the power grid;

a battery storage interface that communicates with the battery storage system;

a power consumer interface that communicates with the power consumer; and a power plant interface that communicates with the independent power plant; and a memory storing an energy management system (EMS) policy and instructions that, when executed, cause the processor to:

obtain a first data set including time-series information for each of:

power usage of the power consumer;

power output of the independent power plant;

power output capacity of the power grid; and state of charge (SOC) of the battery storage system;

train a machine learning (ML) model based on the time-series information using a ML algorithm, wherein the ML model determines one or more parameters of the EMS policy to satisfy a power demand of the power consumer over a predetermined horizon;

obtain a second data set including power availability information from each of the battery storage system, the power grid, and the independent power plant;

determine, by inputting the second data set into the ML model, the one or more parameters of the EMS policy to satisfy the power demand of the power consumer;

transmit a command, based on the EMS policy, to at least one of the power grid, the battery storage system, and the independent power plant to control an amount of power supplied to the power consumer, wherein the EMS policy includes a comparison of the SOC of the battery storage system to the following ranges:

$$SOC \geq SOCref + \Delta SOC, \qquad \text{SOC-A:}$$

$$SOC \leq SOCref - \Delta SOC, \qquad \text{SOC-B:}$$

$$SOCref - \Delta SOC < SOC < SOCref + \Delta SOC, \qquad \text{SOC-C:}$$

wherein SOCref is a charge reference level of the battery storage system, and wherein $\Delta SOC$ is a range parameter that is one of the one or more parameters determined by the ML model, and wherein the EMS policy includes different commands based on the SOC satisfying one of the ranges SOC-A, SOC-B, and SOC-C.

14. The VPP controller of claim 13, wherein the charge reference level, SOCref, is one of the one or more parameters determined by the ML model.

15. The VPP controller of claim 13, wherein the command includes instructions for the independent power plant to provide power to the power consumer, and when the SOC satisfies the range SOC-A, the command includes additional instructions for the battery storage system to provide additional power to satisfy the power demand of the power consumer, when the SOC satisfies the range SOC-B, the command includes additional instructions for:

the power grid to provide additional power to satisfy the power demand of the power consumer; and the power grid to provide power to charge the battery storage system with an entirety of a reference power allocation, when the SOC satisfies the range SOC-C, the command includes additional instructions for the power grid to split the reference power allocation between the power consumer and the battery storage system, wherein a first portion of the reference power allocation provides additional power to satisfy the power demand of the power consumer, and a second portion of the reference power allocation provides power to charge the battery storage system.

16. The VPP controller of claim 15, wherein when the SOC satisfies the range SOC-A, the command includes additional instructions for the power grid to provide additional power to satisfy the power demand of the power consumer.

17. The VPP controller of claim 15, wherein when the SOC satisfies the range SOC-A, the command includes additional instructions for the battery storage system to export energy to the power grid after satisfying the power demand of the power consumer.

18. The VPP controller of claim 15, wherein the power consumer is an electric vehicle (EV) charging station, the time-series information used to train the ML model is based on a maximum charge rate of the EV charging station, and the reference power allocation is based on the maximum charge rate of the EV charging station.

\* \* \* \* \*